US012802988B2

(12) United States Patent
Kim et al.

(10) Patent No.: US 12,802,988 B2
(45) Date of Patent: Nov. 17, 2026

(54) LITHIUM-SULFUR BATTERY ELECTRODE MATERIAL, ELECTRODE, AND LITHIUM-SULFUR BATTERY INCLUDING THE SAME

(71) Applicant: RESEARCH & BUSINESS FOUNDATION SUNGKYUNKWAN UNIVERSITY, Suwon-si (KR)

(72) Inventors: Won Il Kim, Suwon-si (KR); Yoonbin Kim, Suwon-si (KR); Ho Seok Park, Suwon-si (KR); Jun Su Kim, Suwon-si (KR); Jeongyeon Lee, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 487 days.

(21) Appl. No.: 18/583,103

(22) Filed: Feb. 21, 2024

(65) Prior Publication Data

US 2024/0405223 A1 Dec. 5, 2024

(30) Foreign Application Priority Data

Feb. 27, 2023 (KR) ........................ 10-2023-0025862

(51) Int. Cl.

| | |
|---|---|
| ***H01M 4/60*** | (2006.01) |
| ***H01M 4/02*** | (2006.01) |
| ***H01M 4/04*** | (2006.01) |
| ***H01M 4/38*** | (2006.01) |
| ***H01M 4/58*** | (2010.01) |

(52) U.S. Cl.

CPC ......... *H01M 4/608* (2013.01); *H01M 4/0404* (2013.01); *H01M 4/382* (2013.01); *H01M 4/5815* (2013.01); *H01M 2004/028* (2013.01)

(58) Field of Classification Search

CPC ............. H01M 50/258; H01M 50/264; H01M 50/517; H01M 50/244; H01M 50/251; H01M 50/262; H01M 50/207; H01M 2220/10; Y02E 60/10

See application file for complete search history.

(56) References Cited

FOREIGN PATENT DOCUMENTS

| | | |
|---|---|---|
| KR | 10-2018-0010862 A | 1/2018 |
| KR | 10-2021-0010335 A | 1/2021 |

OTHER PUBLICATIONS

Korean Office Action issued on Jan. 24, 2025, in corresponding Korean Patent Application No. 10-2023-0025862. (5pages in Korean).

Lee, Jeongyeon, et al. "Sodium-Coordinated Polymeric Phthalocyanines as Stable High-Capacity Organic Anodes for Sodium-Ion Batteries." Energy & Environmental Materials 6.4, e12468, 2023. (pp. 1-9).

*Primary Examiner* — Matthew T Martin
*Assistant Examiner* — Kevin Song
(74) *Attorney, Agent, or Firm* — LEX IP MEISTER, PLLC

(57) ABSTRACT

According to an embodiment of the present invention, the performance of a positive electrode host material for a lithium-sulfur battery can be optimized to solve the problems of low conductivity of sulfur as an energy storage material and volume expansion during charge and discharge, and as a negative electrode material, a transition metal phthalocyanine polymer can be coated on the surface of a carbon fiber current collector through polymerization, solving the low lithium ion affinity of the carbon fiber current collector.

18 Claims, 25 Drawing Sheets

LITHIUM-SULFUR BATTERY ELECTRODE MATERIAL, ELECTRODE, AND LITHIUM-SULFUR BATTERY INCLUDING THE SAME

CROSS REFERENCE TO RELATED APPLICATION

The present application claims priority to Korean Patent Application No. 10-2023-0025862, filed Feb. 27, 2023, and No. 10-2023-0023911, filed Feb. 22, 2023, the entire contents of which is incorporated herein for all purposes by these references.

BACKGROUND OF THE INVENTION

Field of the Invention

The present invention relates to a lithium-sulfur battery electrode material, electrode, and lithium-sulfur battery including the same.

Description of the Related Art

The use of fossil fuels causes climate change, air pollution, and various environmental problems. Sustainable, eco-friendly energy storage devices are being continuously researched to solve these problems.

Lithium-ion batteries, one of the existing energy storage devices, are not sufficient to meet the demand for high energy density such as that of electric vehicles. In order to increase the energy density, research on lithium-sulfur batteries, lithium-air batteries, and all-solid-state batteries has become active, and the importance of reforming and developing lithium metal anodes is thus emphasized.

A lithium-sulfur battery, which overcome the low energy density of lithium-ion batteries based on the high theoretical capacity of sulfur (1,675 mAh/g), is environmentally friendly because it does not use heavy metals, and can store lithium ions at a low price, has received attention as an energy storage device.

However, in the lithium-sulfur battery, problems such as low charge/discharge efficiency and continuous capacity reduction occur due to the low electrical conductivity ($5\times10^{-30}$S/$cm^2$) of sulfur (Ss) and discharge products, lithium sulfide ($Li_2S$), large volume expansion of 80% during charge and discharge, and precipitation of active materials on the surface of a negative electrode through diffusion of polysulfide intermediates produced during the sulfur reduction process, etc. These problems are becoming obstacles to commercialization of lithium-sulfur battery as energy storage devices.

In order to solve the fundamental problems of lithium-sulfur battery as described above, the use of carbon materials such as graphene and carbon nanotubes, which have high electrical conductivity and surface area and can form a porous structure, as host materials for sulfur has been increasing.

However, the performance and stability of the lithium-sulfur battery were not secured because the weak polar interaction between the carbon material and the polysulfide intermediate did not prevent continuous dissolution of the polysulfide.

Therefore, in order to solve the above-mentioned problems, research is needed to prevent the diffusion of polysulfide intermediates, to develop host materials including the development of carbon composite materials, to coat the surface of lithium metal with inorganic or carbon materials, and to design a three-dimensional current collector.

SUMMARY OF THE INVENTION

The technical object to be achieved by the present invention is to provide, as a positive electrode, a positive electrode host material for a lithium-sulfur battery that can be used as a next-generation energy storage device, and to provide a lithium-sulfur battery that is environmentally friendly and has improved performance compared to existing lithium-sulfur batteries.

The technical object to be achieved by the present invention is to provide a transition metal-phthalocyanine polymer as a negative electrode material and a current collector coating method using the same.

The technical object to be achieved by the present invention is to provide a current collector for an electrode in which the transition metal-phthalocyanine polymer is coated on the current collector, and a negative electrode for a lithium battery including lithium metal located on the current collector.

The technical objects to be achieved by the present invention are not limited to the technical objects mentioned above, and other technical objects not mentioned may be clearly understood by those skilled in the art from the following descriptions.

In order to achieve the above technical problem, an embodiment of the present invention provides a positive electrode material.

In an embodiment of the present invention, the positive electrode material may comprise a polymer including a repeating unit represented by the following Formula 1 and a carbon compound.

[Formula 1]

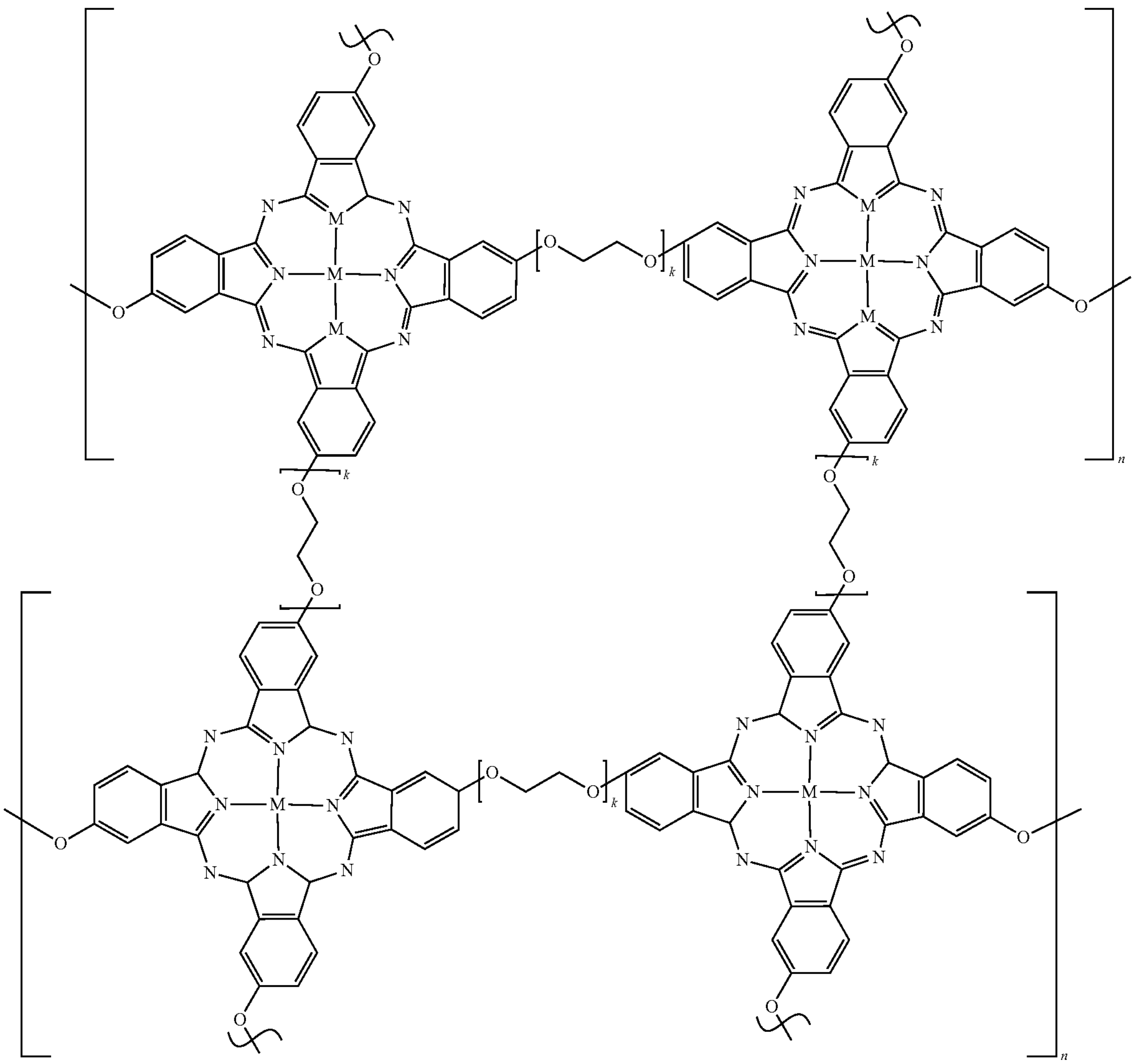

where n may be an integer from 2 to 1000, and k may be an integer from 1 to 5.

In an embodiment of the present invention, the polymer may be prepared from a dimer synthesized by reacting a plurality of compounds represented by the following Formula 2 with a linker.

[Formula 2]

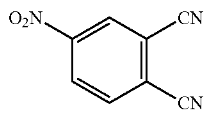

In an embodiment of the present invention, the linker may be a compound represented by the following Formula 3:

[Formula 3]

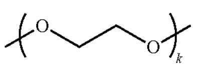

The k may be an integer from 1 to 5.

In an embodiment of the present invention, the reaction may be a nucleophilic substitution reaction.

In an embodiment of the present invention, the carbon compound may include a fullerene or a carbon nanotube.

In an embodiment of the present invention, the transition metal may be one or a plurality of metals selected from cobalt, zinc, nickel, and copper.

In order to achieve the above technical object, another embodiment of the present invention provides a positive electrode for a lithium-sulfur battery.

In an embodiment of the present invention, the positive electrode for a lithium-sulfur battery may include sulfur impregnated in the positive electrode material described above.

In order to achieve the above technical object, another embodiment of the present invention provides a lithium-sulfur battery.

In an embodiment of the present invention, the lithium-sulfur battery may include the above-described positive electrode for a lithium-sulfur battery.

In order to achieve the above technical object, an embodiment of the present invention provides a negative electrode material including a transition metal-phthalocyanine polymer.

In an embodiment of the present invention, the transition metal-phthalocyanine polymer may include a repeating unit represented by the following Formula 4:

[Formula 5]

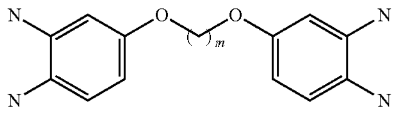

In the Formula 5, the m may be an integer between 2 and 10.

In an embodiment of the present invention, the dimer may be produced by modifying a nitrile-based compound with a linker and then reacting it.

[Formula 4]

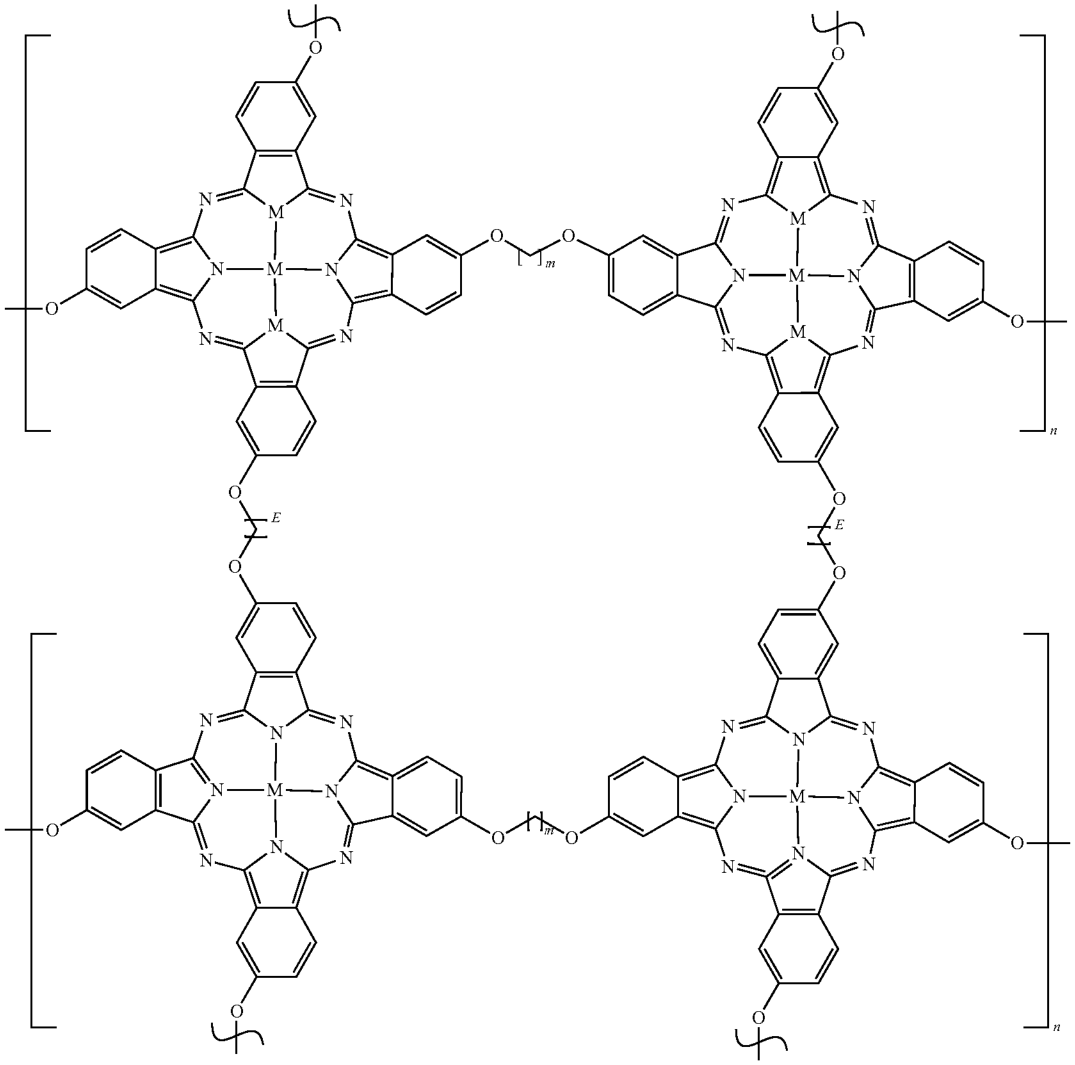

In Formula 4, the n is an integer from 2 to 1000, the m is an integer from 2 to 10, and the M is a transition metal.

In an embodiment of the present invention, the transition metal-phthalocyanine polymer may be prepared from a dimer represented by the following Formula 5:

In an embodiment of the present invention, the linker may be an aprotic solvent.

In an embodiment of the present invention, the transition metal may be one or a plurality of metals selected from cobalt, zinc, nickel, and copper.

In order to achieve the above technical object, another embodiment of the present invention provides a current collector coating method using a transition metal-phthalocyanine polymer.

In an embodiment of the present invention, the current collector coating method using the transition metal-phthalocyanine polymer may comprise the steps of synthesizing a dimer represented by the following Formula 5; producing a transition metal-phthalocyanine polymer represented by the following Formula 4 by polymerizing the dimer with an organic compound including a transition metal; and coating the transition metal-phthalocyanine polymer on a current collector.

In an embodiment of the present invention, the step of synthesizing the dimer represented by the Formula 5 may be configured to include the steps of modifying a plurality of phthalonitriles with a linker; and connecting the plurality of modified phthalonitriles with the linker.

In an embodiment of the present invention, the transition metal may be one or a plurality of metals selected from cobalt, zinc, nickel, and copper.

In an embodiment of the present invention, in the step of coating the transition metal-phthalocyanine polymer on the current collector, the coating may be coated by performing a solvothermal synthesis method.

[Formula 4]

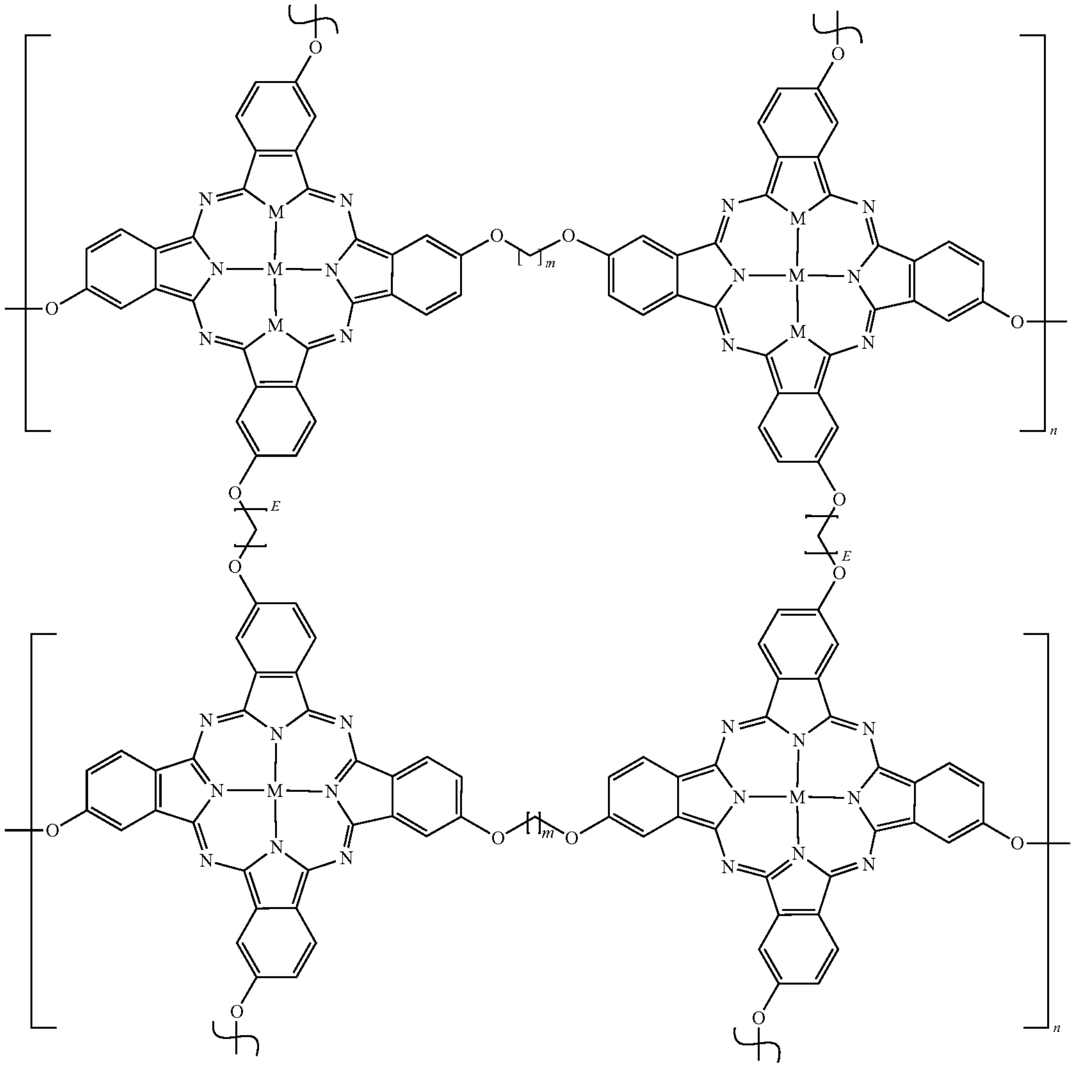

In the Formula 4, the n is an integer from 2 to 1000, the m is an integer from 2 to 10, and the M is a transition metal.

[Formula 5]

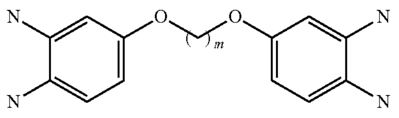

In the Formula 5, the m is an integer from 2 to 10.

In order to achieve the above technical object, another embodiment of the present invention provides a current collector for an electrode.

In an embodiment of the present invention, the current collector for an electrode may comprise a current collector; and the above-described transition metal-phthalocyanine polymer coated on the current collector.

In an embodiment of the present invention, the current collector may include a composite structure including a carbon fiber.

In order to achieve the above technical object, another embodiment of the present invention provides a negative electrode for a lithium battery.

In an embodiment of the present invention, the negative electrode for a lithium battery may include the above-described current collector; and a lithium metal located on the current collector.

DETAILED DESCRIPTION OF THE INVENTION

Figure 1:
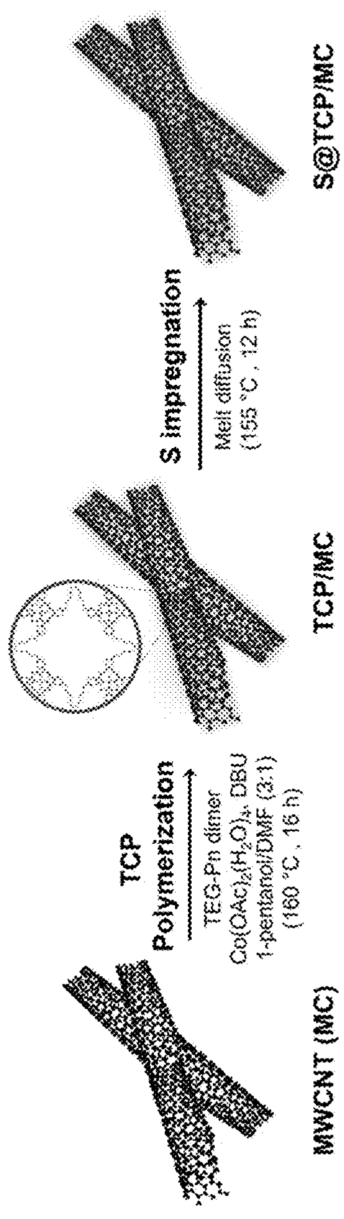
FIG. 1 is a schematic diagram simply showing a synthesis process of a sulfur cobalt phthalocyanine polymer-carbon nanotube composite as a positive electrode material according to an embodiment of the present invention.

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected (accessed, contacted, coupled) to" another element, this includes not only cases where the elements are "directly connected," but also cases where the elements are "indirectly connected" with another member therebetween. Also, it will also be understood that when a component "includes" an element, unless stated otherwise, this does not mean that other elements are excluded, but that other element may be further added.

The terms used herein are only used to describe specific embodiments and are not intended to limit the present invention. The singular forms are intended to include the plural forms as well, unless the context clearly indicates otherwise. In the specification, it will be further understood that the terms "comprise" and "include" specify the presence of stated features, integers, steps, operations, elements, components, and/or combinations thereof, but do not preclude in advance the possibility of the presence or addition of one or more other features, integers, steps, operations, elements, components, and/or combinations.

Hereinafter, the embodiments of the present invention will be explained with reference to the accompanying drawings.

FIG. 1 is a schematic diagram simply showing a synthesis process of a positive electrode material.

The positive electrode material may comprise a polymer including a repeating unit represented by the following Formula 1 and a carbon compound:

[Formula 1]

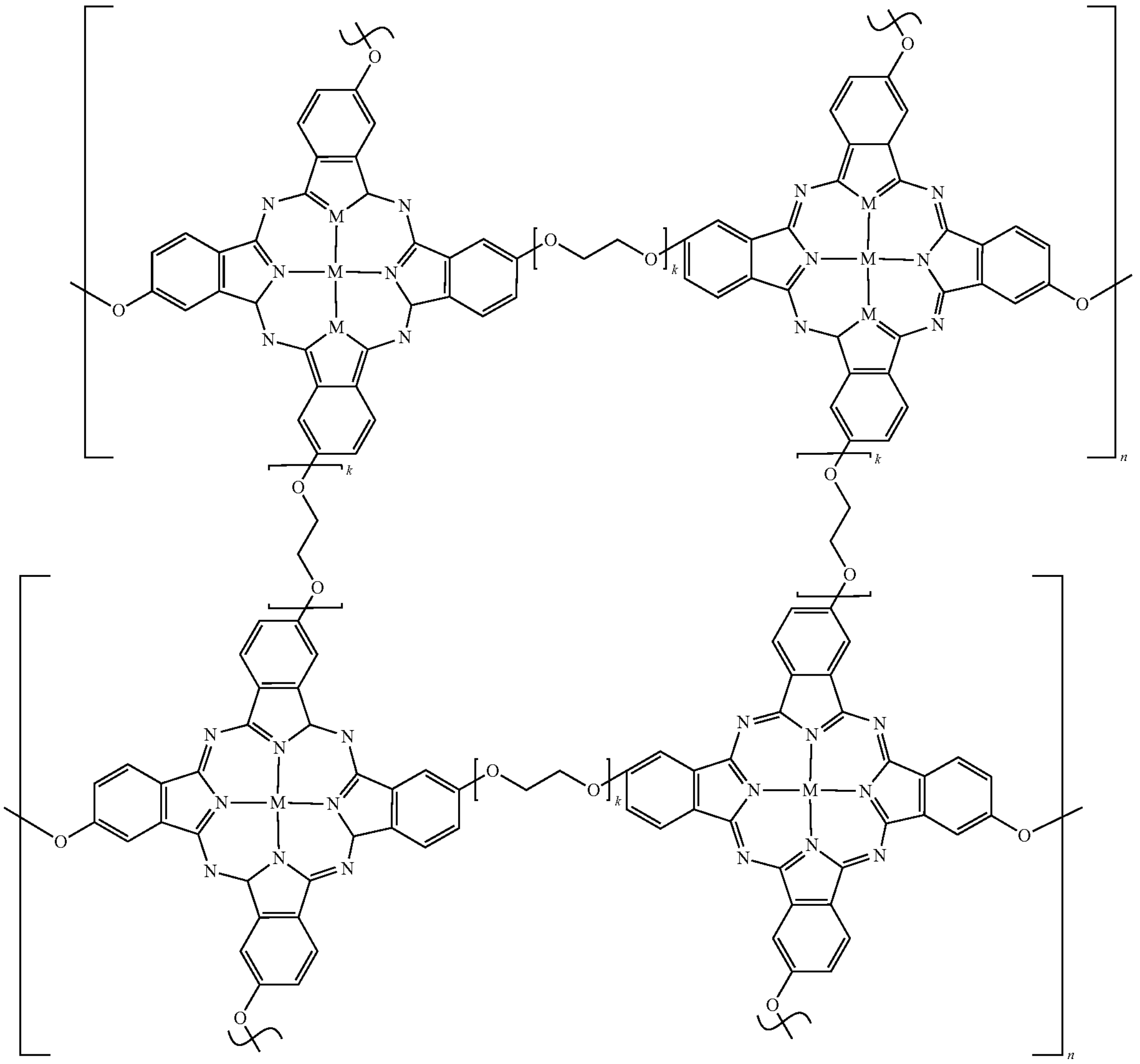

In this case, the n may be an integer from 2 to 1000, and the k may be an integer from 1 to 5.

The reason that the range of k is 1 to 5 is to arbitrarily control the length to proceed with efficient cyclization. When the chain length is long, during the reaction between phthalonitrile dimers, the reaction distance varies and the reaction does not proceed smoothly. Since the problem of decreased polymer production may occur, the range of k may be preferably 1 to 5.

Preferred examples of the carbon compound may include fullerene or carbon nanotube, but are not limited thereto as long as it is a carbon structure.

In this case, the polymer represented by Formula 1 may be, for example, a cobalt phthalocyanine polymer, the carbon compound may be a carbon nanotube, and in this case, the positive electrode material may be a cobalt phthalocyanine-carbon nanotube composite.

The polymer may be prepared from a dimer synthesized by reacting a plurality of compounds represented by the following Formula 2 with a linker.

[Formula 2]

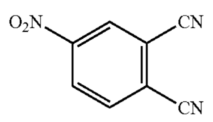

The compound represented by Formula 2 above may be nitrophthalonitrile.

The linker may be a compound represented by the following Formula 3:

[Formula 3]

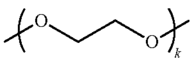

In this case, the k may be an integer between 1 and 5.

In the linker, the reason that the k ranges from 1 to 5 is to arbitrarily control the length to proceed with efficient cyclization. When the chain length is long, during the nucleophilic substitution reaction to produce a phthalonitrile dimer, the reaction may not proceed smoothly due to changes in the reaction distance, which may cause problems such as a decrease in polymer production. Therefore, the range of k may be preferably 1 to 5.

Considering the range of k, triethylene glycol may be used as a preferred example of the linker.

The polymer represented by Formula 1 may be produced by reacting a plurality of compounds represented by Formula 2 with the linker represented by Formula 3 to prepare a dimer, followed by a polymerization reaction with an organic compound including a transition metal.

The dimer may be produced, for example, by dissolving 4-nitrophthalonitrile and triethylene glycol in dimethylformamide, then adding potassium carbonate and reacting at 50° C. for 24 to 72 hours to produce a reaction mixture. Thereafter, distilled water may be used in the reaction mixture including the dimer, then the organic material may be eluted through stirring and filtered using vacuum filtration. Additionally, the reaction mixture may be cooled to room temperature, filtered to obtain a resulting material, and then dried in a vacuum oven to obtain the dimer.

The polymerization reaction between the dimer and an organic compound including a transition metal may be a reaction in which cobalt acetate dissolved in 1-pentanol in which carbon nanotubes are dispersed reacts with DBU and reacts with the cyanine group (—CN) of phthalonitrile to induce cyclization.

In this case, cobalt phthalocyanine polymer linked with triethylene glycol as a linker may be synthesized on the surface of a carbon nanotube through Π-Π interaction.

The cobalt phthalocyanine polymer-carbon nanotube composite, which is a preferred example of the positive electrode material of the present invention, has the advantage that the cobalt phthalocyanine polymer may be synthesized with a uniform thickness on the surface of the carbon nanotube, and the thickness may be, for example, 2 nm to 3 nm.

The composite of the present invention may spontaneously adsorb the sulfur portion of polysulfide, and after sulfur is adsorbed to the composite, a new bond is formed between nitrogen and lithium, so that the nitrogen of the composite spontaneously adsorbs the lithium portion of polysulfide, thereby providing a lithium-friendly environment.

The complex of the present invention has the advantage of being able to increase the diffusion rate of lithium ions by utilizing triethylene glycol as a linker, and to prevent aggregation between cobalt phthalocyanine polymers by arbitrarily adjusting the length of the linker.

In addition, the complex has a stronger catalytic activity ability than that of existing sulfur-carbon nanotubes, and may prevent the problem of shortening the lifespan of batteries prepared later by reducing reaction overpotential.

Another embodiment of the present invention, a positive electrode for a lithium-sulfur battery, will be described.

The positive electrode for a lithium-sulfur battery may include sulfur impregnated in the positive electrode material described above, and the composite may be, for example, a cobalt phthalocyanine polymer-carbon nanotube composite.

The sulfur impregnated in the positive electrode for a lithium-sulfur battery may be prepared by mixing the sulfur and the cobalt phthalocyanine polymer-carbon nanotube composite at a mass ratio of 3:1 to prepare a mixture, and then placing the mixture in a Teflon container and reacting at 155° C. for 12 hours to induce a reaction to impregnate sulfur so that the sulfur is impregnated. Accordingly, a positive electrode including a sulfur cobalt phthalocyanine polymer-carbon nanotube composite may be prepared.

Since the positive electrode for a lithium-sulfur battery includes the sulfur cobalt phthalocyanine polymer-carbon nanotube composite, there is an advantage that a uniform electrode structure is maintained under the influence of the composite before and after charging and discharging.

Figure 7:
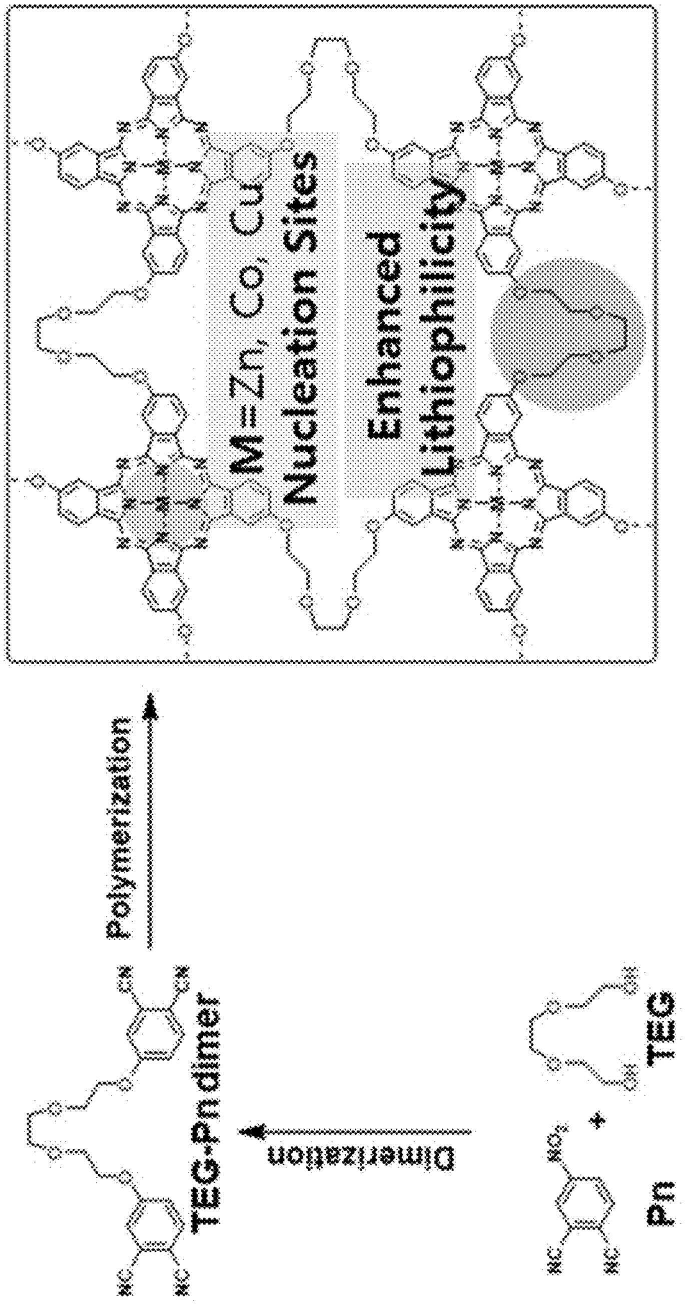
FIG. 7 shows a synthesis process of a transition metal-phthalocyanine polymer according to an embodiment of the present invention.

FIG. 7 shows a synthesis process of a transition metal-phthalocyanine polymer as a negative material, according to an embodiment of the present invention.

The transition metal-phthalocyanine polymer may include a repeating unit represented by the following Formula 4:

[Formula 4]

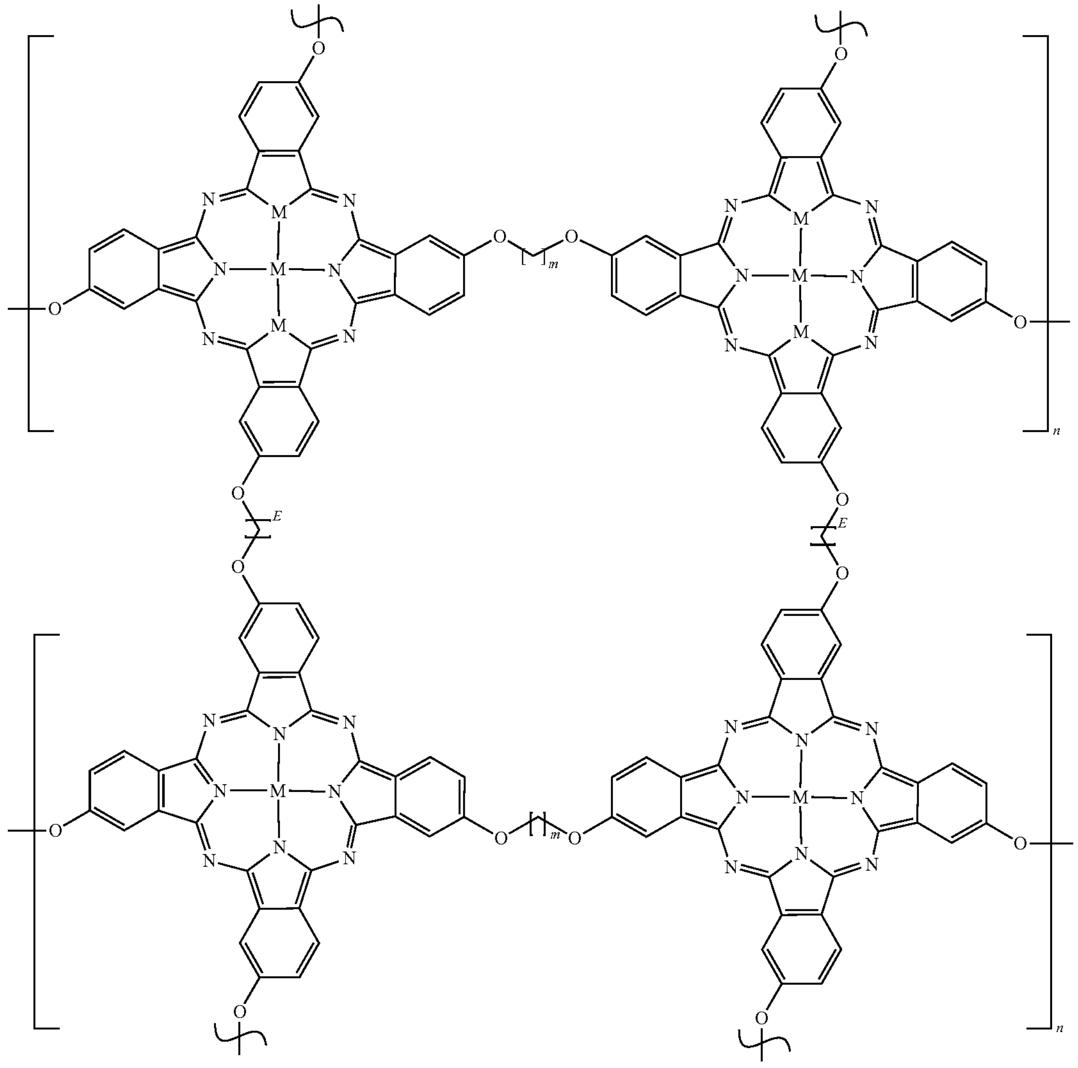

In this case, in the Formula 4, the n is an integer from 2 to 1000, the m is an integer from 2 to 10, and the M may be a transition metal.

In this case, since the number of alkyl groups may not be limited, the parenthesis portion indicated by the area of m provides an integer of 2 to 10 as the preferred range of m. The transition metal may be one or a plurality of metals selected from cobalt, zinc, nickel, and copper.

The transition metal-phthalocyanine polymer may be prepared from a dimer represented by the following Formula 5:

[Formula 5]

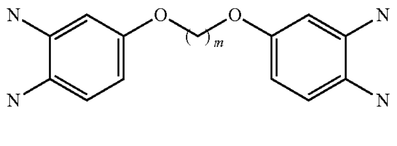

In this case, in the Formula 5, the m may be an integer between 2 and 10.

The reason that the m is an integer of 2 to 10 is to ensure efficient cyclization. When the chain length of the linker is long, the reaction distance may vary during the reaction between phthalonitriles, so that there may be a problem of preventing smooth progress of cyclization.

The dimer may be produced by modifying a nitrile-based compound with a linker and then reacting it.

The dimer is a material made by polymerizing two identical molecules, and may be referred to as a dimer or duplex.

The nitrile-based compound refers to an organic compound including a functional group consisting of a triple bond between a carbon element and a nitrogen element, and may be, for example, phthalonitrile.

The linker may refer to a connector that connects a compound to a compound. In the case of the present invention, phthalonitrile and phthalonitrile may be modified and then reacted to produce a phthalonitrile dimer.

The linker may be a polar aprotic solvent that does not provide hydrogen cations, for example, triethylene glycol (TEG).

The triethylene glycol is a polar aprotic solvent with thermal stability, and may be ideally used in separation processes and high temperature reactions due to its high boiling point and stability.

In addition, triethylene glycol has four oxygen functional groups and may act as an effective host for lithium ions.

In the case of the present invention, the phthalonitrile dimer may stably bind to various metals through modification of triethylene glycol, which is a linker, and exhibits various chemical properties, so it has the advantage of providing long-term charge/discharge stability of a battery that the present invention aims to achieve.

A current collector coating method using a transition metal-phthalocyanine polymer, which is another embodiment of the present invention, will be described.

The current collector coating method using the transition metal-phthalocyanine polymer may comprise the steps of synthesizing a dimer represented by the following Formula 5; producing a transition metal-phthalocyanine polymer represented by the following Formula 4 by polymerizing the dimer with an organic compound including a transition metal; and coating the transition metal-phthalocyanine polymer on a current collector.

[Formula 5]

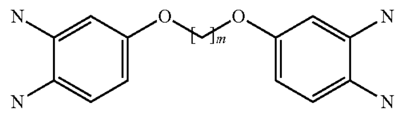

In the Formula 5, the m is an integer from 2 to 10.

The reason that the m is an integer of 2 to 10 is to ensure efficient cyclization. When the chain length is long, the reaction distance may vary during the reaction between phthalonitriles, so there may be a problem that prevents smooth progress of cyclization.

The step of synthesizing the dimer represented by the Formula 5 may be performed on the principle of nucleophilic substitution reaction of the linker, which is a polar aprotic solvent.

In the step of polymerizing the dimer with the organic compound including a transition metal to produce the transition metal-phthalocyanine polymer represented by the following Formula 4, the transition metal may be one or more selected from cobalt, zinc, nickel, and copper.

[Formula 4]

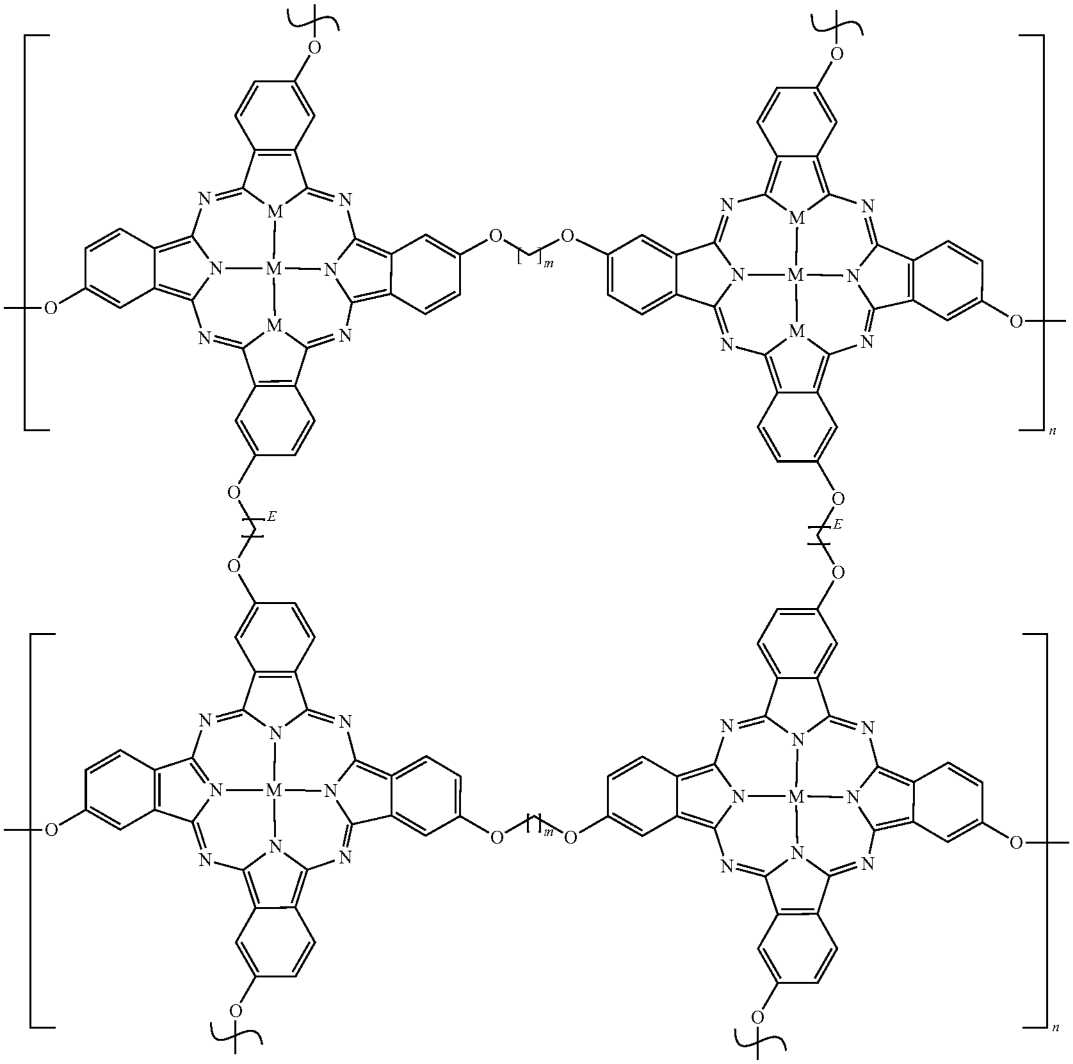

In the Formula 4, the n is an integer from 2 to 1000, the m is an integer from 2 to 10, and the M may be a transition metal:

The organic compound refers to metal acetate, and the metal may be one or more selected from cobalt, zinc, nickel, and copper, but is not limited thereto.

According to an embodiment of the present invention, the polymerization of the dimer with the organic compound including a transition metal may be performed with a principle in which the metal acetate dissolved in 1-pentanol reacts with DBU, stimulates the cyanine group (—CN) of the phthalonitrile dimer in the form of pentanolate, and cyclization occurs.

In the step of coating the transition metal-phthalocyanine polymer on the current collector, the coating may be coated by performing a solvothermal synthesis method.

The solvothermal synthesis method is a method of precipitating a precursor in the form of a hydroxide, washing it and dispersing it in a solvent, and then synthesize is performed under appropriate temperature and pressure. For example, it may be performed in a Teflon liner shielded by high-pressure sterilization.

A current collector for an electrode, which is another embodiment of the present invention, will be described.

The current collector for an electrode may include a current collector; and the above-described transition metal-phthalocyanine polymer coated on the current collector.

The current collector for an electrode is an important component in preparing a thin film electrode plate, and may serve as a pathway to transfer electrons from the outside so that an electrochemical reaction occurs in the active material, or to receive electrons from the active material and send them to the outside.

The current collector for an electrode may include a composite structure including a carbon fiber.

The carbon fiber current collector of the present invention may have the transition metal-phthalocyanine polymer coated on the current collector by solvothermal synthesis. For example, the solvothermal synthesis may be performed in a hydrothermal synthesizer at 180° C. for 16 hours.

It may be applicable as a lithium metal battery by depositing lithium metal on the carbon fiber current collector coated with the transition metal-phthalocyanine polymer.

In the carbon fiber current collector coated with the transition metal-phthalocyanine polymer, the carbon fiber is coated on the surface of the current collector, thereby solving the problems of low lithium ion affinity of the carbon fiber current collector and dendritic crystal growth caused by uneven lithium ion distribution.

In addition, the properties of the material can be easily controlled by changing the linkage required for polymerization during the synthesis process, which has the advantage of controlling the deposition of optimized lithium metal and applying it as an energy storage material. A negative electrode for a lithium battery, which is another embodiment of the present invention, will be described.

The lithium battery may be configured to include a positive electrode, a negative electrode, an electrolyte, and a separator, and the negative electrode for a lithium battery of the present invention may include the above-described current collector; and a lithium metal located on the current collector.

The negative electrode for a lithium battery is one in which lithium metal is deposited on the carbon fiber current collector coated with the transition metal-phthalocyanine polymer. The lithium battery may be prepared through the process of making a half cell by using the coated carbon fiber current collector as a working electrode, using lithium metal foil as a reference electrode and a counter electrode, and adding an electrolyte with an olefin material separator in between.

In the negative electrode for a lithium battery in which lithium metal is deposited on the carbon fiber current collector coated with the transition metal-phthalocyanine polymer, there is no growth of dendritic crystals of lithium metal, and there is an advantage in that cycle stability is maintained for a long time compared to the negative electrode for a lithium battery in which lithium metal is deposited on a conventional carbon fiber current collector.

Another embodiment of the present invention, a lithium-sulfur battery including the above-described positive electrode for a lithium-sulfur battery, will be described.

The lithium-sulfur battery may include a positive electrode, a negative electrode, and an electrolyte.

The lithium-sulfur battery may include a positive electrode prepared by mixing the above-described sulfur cobalt phthalocyanine polymer-carbon nanotube composite, a conductive material, and a binder in a mass ratio of 7:2:1 or 8:1:1 and pasting the mixture on aluminum foil.

In this case, the conductive material may be, for example, a carbon black.

The material used as the electrolyte may be, for example, a mixture of a polypropylene separator and dioxolane and dimethoxyethane mixed in a volume ratio of 1:1 in which 1M lithium bis (trifluoromethanesulfonyl) imide (LiTFSI) and 0.3M lithium nitrate ($LiNO3$) were dissolved.

The lithium-sulfur battery of the present invention has a lower overpotential value generated during the oxidation-reduction process compared to that of the existing lithium-sulfur battery including carbon nanotubes, and thus, can prevent shortening of the life of the battery and has the advantage of having a fast reaction speed by having a strong current intensity.

In addition, the lithium-sulfur battery of the present invention has the advantage of having high reversible capacity and stable capacity maintenance at high rates compared to the existing lithium-sulfur batteries including carbon nanotubes.

Preparation Example 1

In order to synthesize sulfur cobalt phthalocyanine polymer-carbon nanotubes according to FIG. 1, first, 4-nitro phthalonitrile and triethylene glycol were dissolved in dimethylformamide, then potassium carbonate was added and reacted at 50° C. for 24 hours to 72 hours.

Next, distilled water was stirred in the reaction mixture containing the synthesized dimer for 1 hour, and the eluate was stirred in ethanol at room temperature for 6 hours.

Next, the reaction mixture was cooled to room temperature, the resulting product was filtered through filtration, and then dried in a vacuum oven at 60° C. for 12 hours to prepare triethylene glycol-phthalonitrile dimer.

Next, in order to synthesize the cobalt phthalocyanine polymer-carbon nanotube composite, a solution was prepared by dissolving triethylene glycol-phthalonitrile dimer and cobalt acetate in a solvent containing 1-pentanol with dispersed carbon nanotubes and dimethylformamide mixed in a volume ratio of 3:1 at 80° C.

In this case, a coating layer may be controlled by controlling the mass ratio of carbon nanotubes and triethylene glycol-phthalonitrile dimer to 1:3 to 3:1.

Next, 1,8-diazabicyclo [5, 4, 0] undec-7-ene (DBU) was added to the solution and reacted at 160° C. for 16 hours.

Next, the solution was centrifuged several times for 5 minutes at 8000 rotations per minute, and then dried at 60° C. for 24 hours.

The dried material was reacted at 300° C. to 350° C. for 2 hours to prepare a cobalt phthalocyanine polymer-carbon nanotube composite.

Next, in order to synthesize the sulfur cobalt phthalocyanine polymer-carbon nanotube composite, sulfur and the previously prepared cobalt phthalocyanine polymer-carbon nanotube composite were mixed at a mass ratio of 3:1.

Next, the mixture of sulfur and cobalt the phthalocyanine polymer-carbon nanotube composite at a mass ratio of 3:1 was placed in a Teflon container and reacted at 155° C. for 12 hours to prepare a sulfur cobalt phthalocyanine polymer-carbon nanotube composite.

Additionally, in order to evaluate the electrochemical performance of the lithium-sulfur battery, a lithium-sulfur battery was prepared using a positive electrode of a sulfur cobalt phthalocyanine polymer-carbon nanotube composite.

First, the previously synthesized sulfur cobalt phthalocyanine polymer-carbon nanotube composite, a carbon black as a conductive agent, and polyvinylidene fluoride (PVDF) as a binder were mixed at a mass ratio of 7:2:1 or 8:1:1, and the mixture was pasted onto a high-purity aluminum foil to prepare a positive electrode, and then was completely dried in an oven at 80° C. for 8 hours before use.

In this case, lithium metal was used as a counter positive electrode in an argon atmosphere.

In addition, it was prepared of a 2032 type coin cell, and an electrolyte including a mixture of a polypropylene separator and dioxolane and dimethoxyethane mixed in a volume ratio of 1:1 in which 1M lithium bis (trifluoromethanesulfonyl) imide (LiTFSI) and 0.3M lithium nitrate (LiNO3) were dissolved was used.

Additionally, a battery assembly process was always performed in an argon atmosphere glove box where the moisture and oxygen content was maintained below 0.1 ppm.

Preparation Example 2

FIG. 7 simply shows the synthesis process of the transition metal phthalocyanine polymer.

First, triethylene glycol-phthalonitrile dimer was synthesized through a nucleophilic substitution reaction of triethylene glycol (TEG) using 4-nitrophthalonitrile dissolved in dimethylformamide (DMF) and potassium carbonate.

Next, the metal acetate $Co(OAc)_2$, $Zn(OAc)_2$, 또는 $Cu(OAc)_2$ dissolved in 1-pentanol was reacted with 1,8-diazabicyclo[5,4,0]undec-7-ene (DBU), so the transition metal phthalocyanine polymer was synthesized by inducing cyclization of phthalonitrile in the form of pentanolate at a temperature of 160° C.

Figure 8:
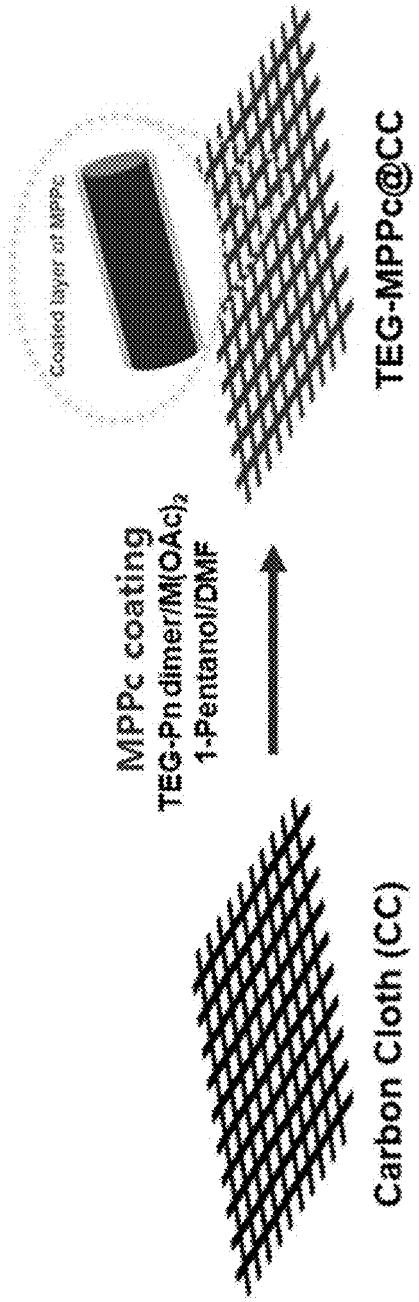
FIG. 8 shows a process of coating a transition metal-phthalocyanine polymer on a carbon fiber current collector according to an embodiment of the present invention.

FIG. 8 is a schematic diagram simply showing a process of coating a transition metal-phthalocyanine polymer on a carbon fiber current collector according to an embodiment of the present invention.

First, the synthesized transition metal phthalocyanine polymer was reacted with a carbon fiber in a solvothermal synthesizer for 16 hours to synthesize the carbon fiber (TEG-MPPc@CC) coated the transition metal-phthalocyanine polymer coated with phthalocyanine polymer.

Next, the carbon fiber coated with the synthesized polymer was additionally heat treated at 300° C. for 2 hours to remove residual solvent and small organic molecules.

Preparation Example 3

A negative electrode for a lithium battery including the carbon fiber current collector coated with the transition metal-phthalocyanine polymer was prepared by depositing lithium metal on the carbon fiber current collector coated with the transition metal-phthalocyanine polymer synthesized in Preparation Example 2.

First, in order to deposit lithium metal on the carbon fiber current collector coated with the transition metal-phthalocyanine polymer, the coated current collector is used as a working electrode, a lithium metal foil is used as a reference electrode and a counter electrode, and an electrolyte is added with an olefin material separator in between, so that a half-cell was prepared.

In this case, the electrolyte was injected by mixing 2% by weight $LiNO_3$ with 1M LiTFSI including a weight ratio of DOL:DME of 1:1, and the type of battery was a 2032 coin battery.

The preparing process was performed in an argon atmosphere and water and oxygen were maintained at less than 0.1 ppm.

Next, the battery was stabilized for 4 hours and then the following experiments were performed.

Experimental Example 1

Figure 2A:
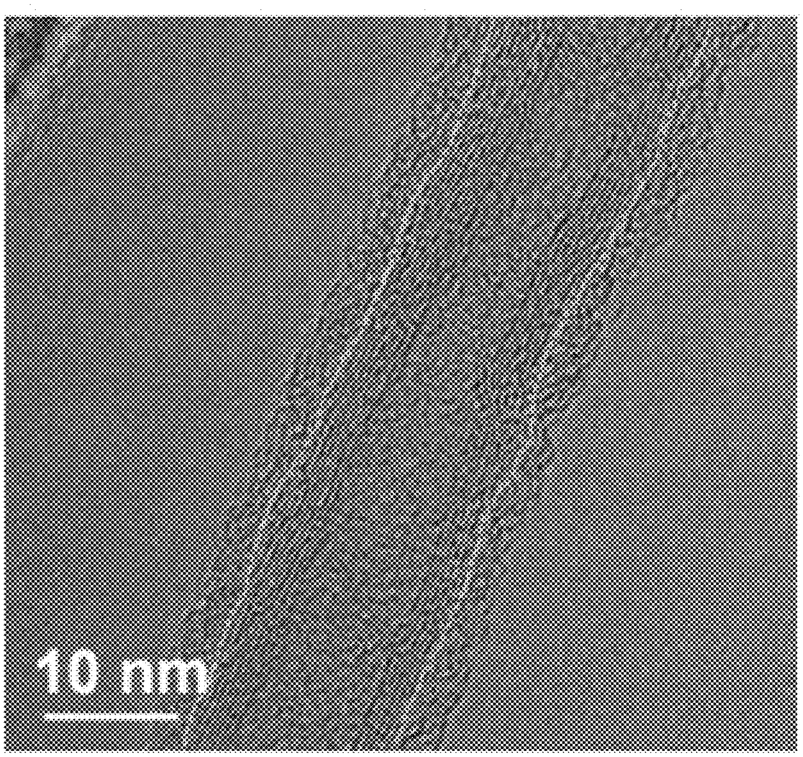
FIG. 2A is a transmission electron microscope image of a cobalt phthalocyanine polymer-carbon nanotube composite and FIG. 2A shows a high-magnification transmission image.
Figure 2B:
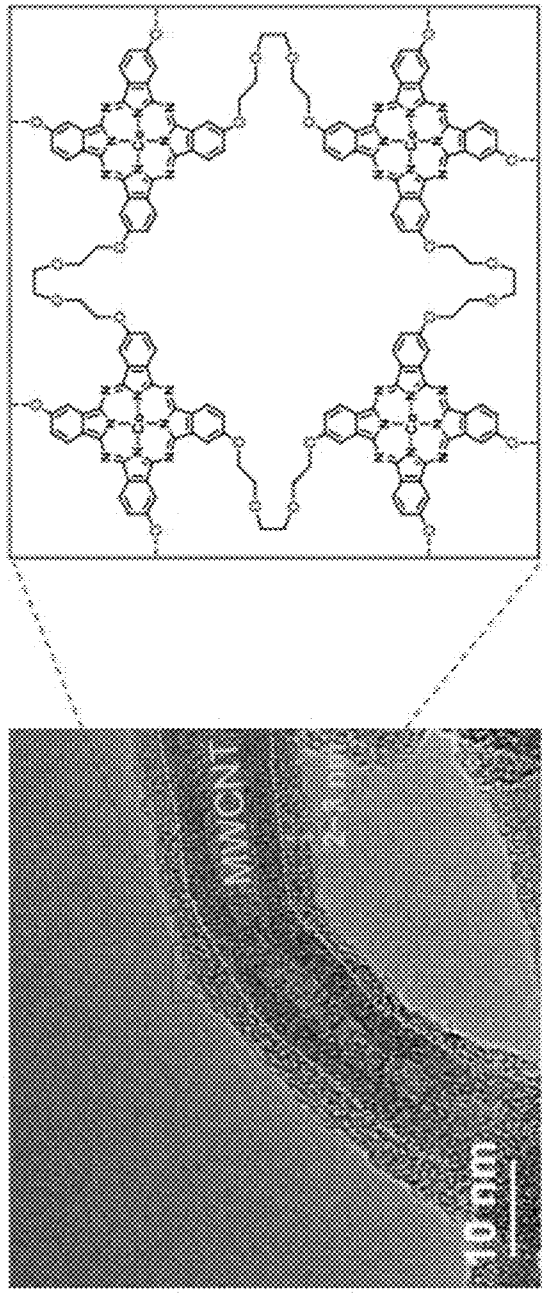
FIG. 2B is a transmission electron microscope image of a cobalt phthalocyanine polymer-carbon nanotube composite and FIG. 2B shows the structure of the cobalt phthalocyanine polymer-carbon nanotube complex.

FIG. 2 is a transmission electron microscope image of a cobalt phthalocyanine polymer-carbon nanotube composite. FIG. 2A shows a high-magnification transmission image, and FIG. 2B shows the structure of the cobalt phthalocyanine polymer-carbon nanotube complex.

Referring to FIG. 2B, it can be seen that the cobalt phthalocyanine polymer was uniformly synthesized to a thickness of 2 to 3 nm on the surface of the carbon nanotube.

FIG. 3 is a scanning electron microscope picture. FIGS. 3A and 3B are photographs before and after charge and discharge of a lithium-sulfur battery prepared using a positive electrode of a sulfur cobalt phthalocyanine polymer-carbon nanotube composite. FIGS. 3C and 3D are photographs showing analysis of a positive electrode of a sulfur carbon nanotube before and after charge and discharge using a scanning electron microscope.

Figure 3A:
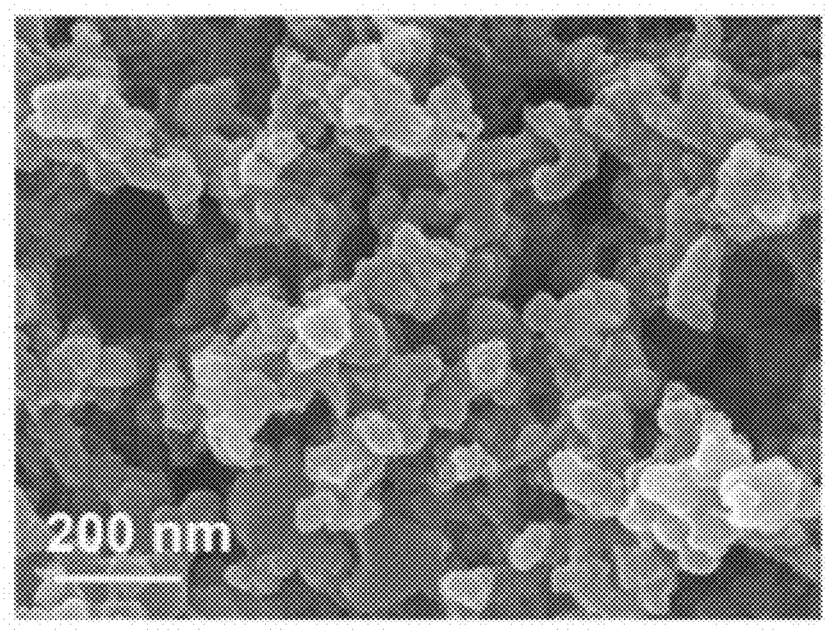
FIG. 3A is a scanning electron microscope photograph before and after charge and discharge of a lithium-sulfur battery prepared using a positive electrode of a sulfur cobalt phthalocyanine polymer-carbon nanotube composite.
Figure 3B:
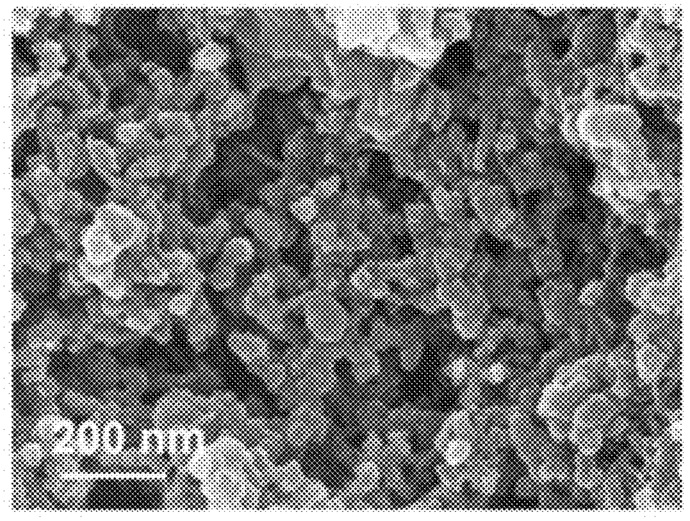
FIG. 3B is a scanning electron microscope photograph before and after charge and discharge of a lithium-sulfur battery prepared using a positive electrode of a sulfur cobalt phthalocyanine polymer-carbon nanotube composite.

Referring to FIGS. 3A to 3B, it can be seen that when the cobalt phthalocyanine polymer was synthesized on the surface of the carbon nanotube, uniform sulfur impregnation was achieved.

In addition, it can be confirmed that a uniform structure of a positive electrode is maintained even after charging and discharging due to the influence of the cobalt phthalocyanine polymer.

Figure 3C:
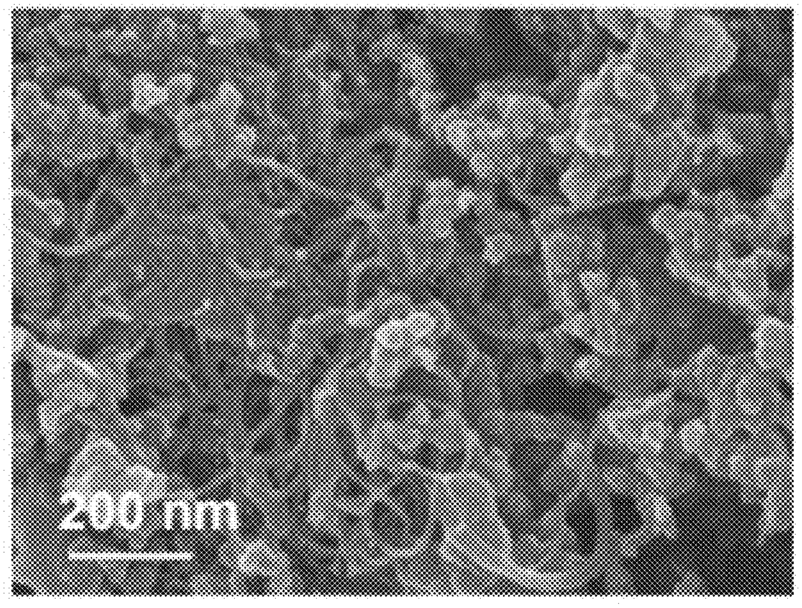
FIG. 3C is a photograph showing analysis of a positive electrode of a sulfur carbon nanotube before and after charge and discharge using a scanning electron microscope.
Figure 3D:
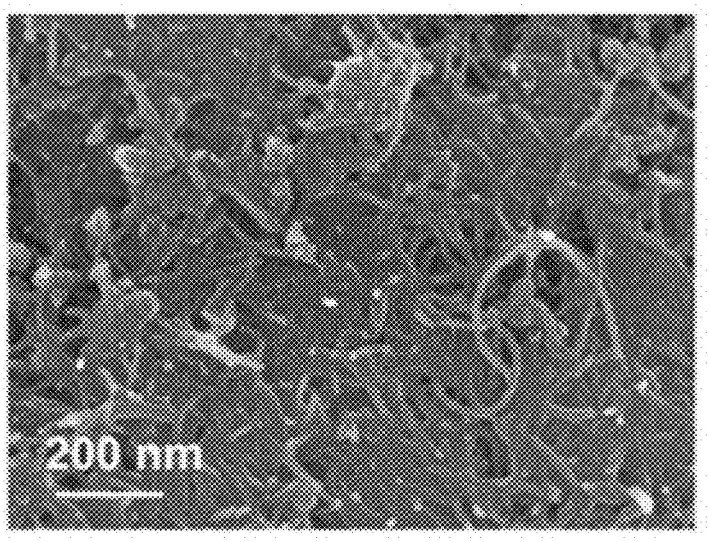
FIG. 3D is a photograph showing analysis of a positive electrode of a sulfur carbon nanotube before and after charge and discharge using a scanning electron microscope.

On the other hand, referring to FIGS. 3C and 3D, it can be seen that sulfur impregnation was not uniform after charging and discharging.

Figure 4A:
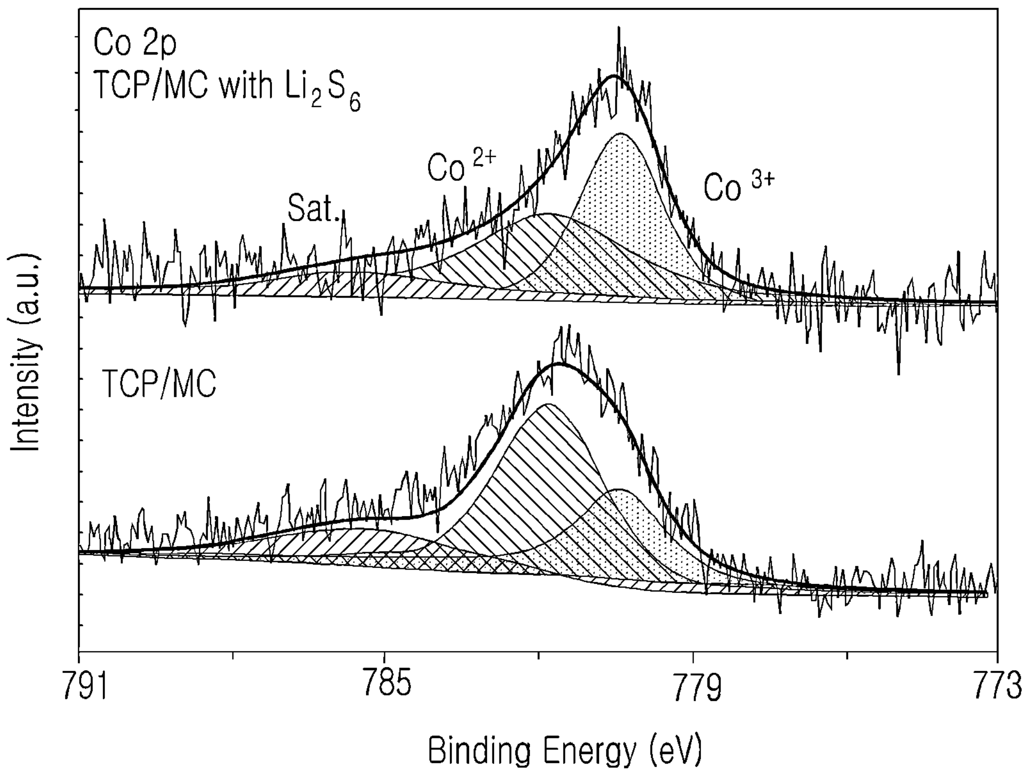
FIG. 4A is a graph of X-ray photoelectron spectroscopy of a sulfur cobalt phthalocyanine polymer-carbon nanotube composite as a catalyst according to an embodiment of the present invention, showing Co 2p spectrum.
Figure 4B:
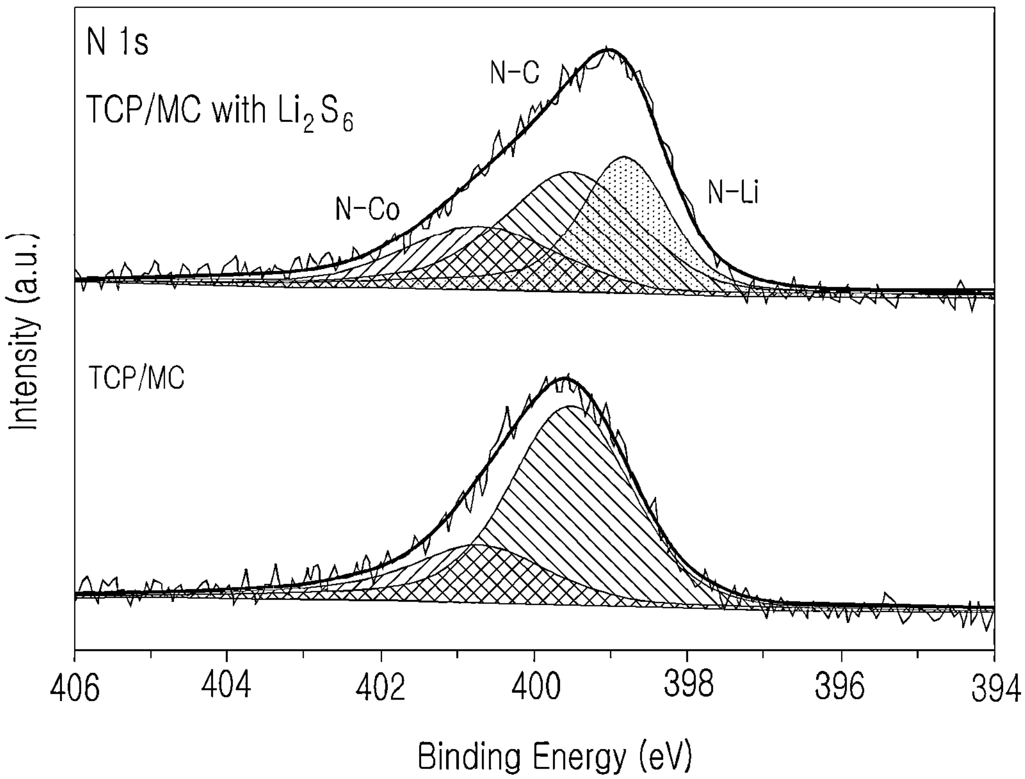
FIG. 4B is a graph of X-ray photoelectron spectroscopy of a sulfur cobalt phthalocyanine polymer-carbon nanotube composite as a catalyst according to an embodiment of the present invention, showing the N 1s spectrum.
Figure 4C:
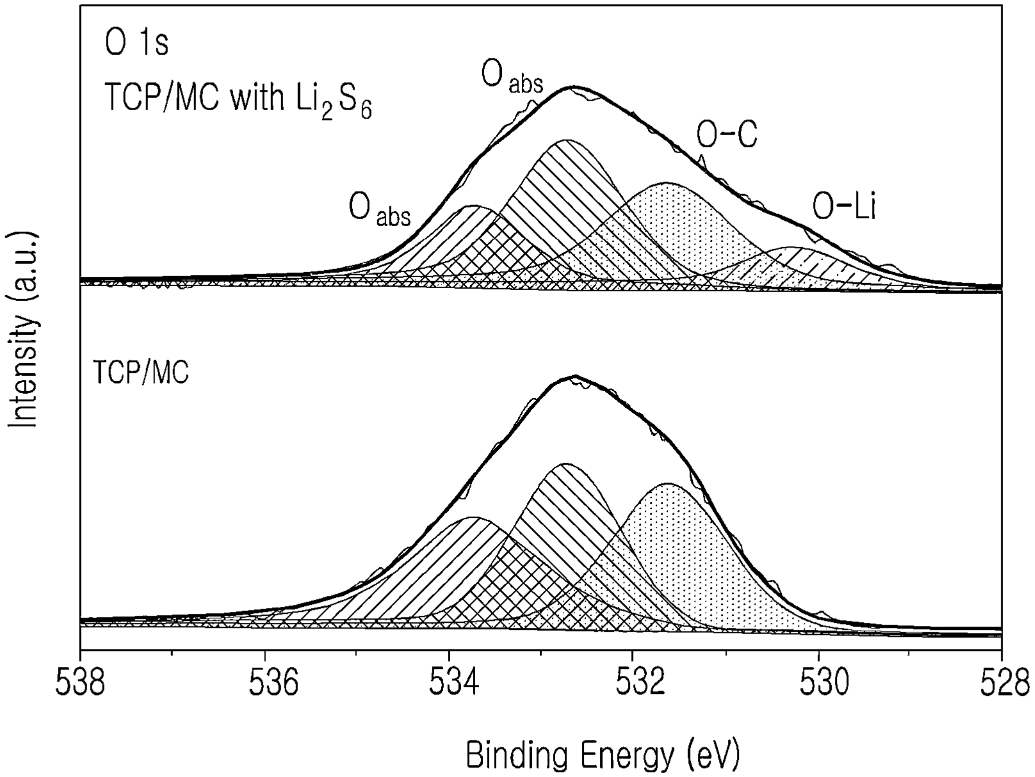
FIG. 4C is a graph of X-ray photoelectron spectroscopy of a sulfur cobalt phthalocyanine polymer-carbon nanotube composite as a catalyst according to an embodiment of the present invention, showing the O 1s spectrum.

FIG. 4 is a graph of X-ray photoelectron spectroscopy of a sulfur cobalt phthalocyanine polymer-carbon nanotube composite as a catalyst. FIG. 4A shows Co 2p, FIG. 4B shows N 1s, and FIG. 4C shows O 1s.

Referring to FIG. 4A, it can be confirmed from the Co 2p result that after polysulfide adsorption, the cobalt phthalocyanine polymer-carbon nanotube complex spontaneously adsorbs the sulfur portion of polysulfide through an increase in the valence of cobalt.

Referring to FIG. 4B, it can be confirmed from the N 1s result that after polysulfide adsorption, the nitrogen of the cobalt phthalocyanine polymer-carbon nanotube composite spontaneously adsorbs the lithium portion of polysulfide through new bond formation of nitrogen and lithium.

Referring to FIG. 4C above, it can be confirmed from the O 1s result that after polysulfide adsorption, the triethylene glycol linkage of the cobalt phthalocyanine polymer-carbon nanotube composite increases a lithium ion diffusion rate, and spontaneously adsorbs polysulfide through new bond formation of oxygen and lithium.

FIG. 5 is a graph comparing and evaluating a catalytic action of a lithium-sulfur battery polysulfide of a cobalt phthalocyanine polymer-carbon nanotube composite with a carbon nanotube as a comparison group.

Figure 5A:
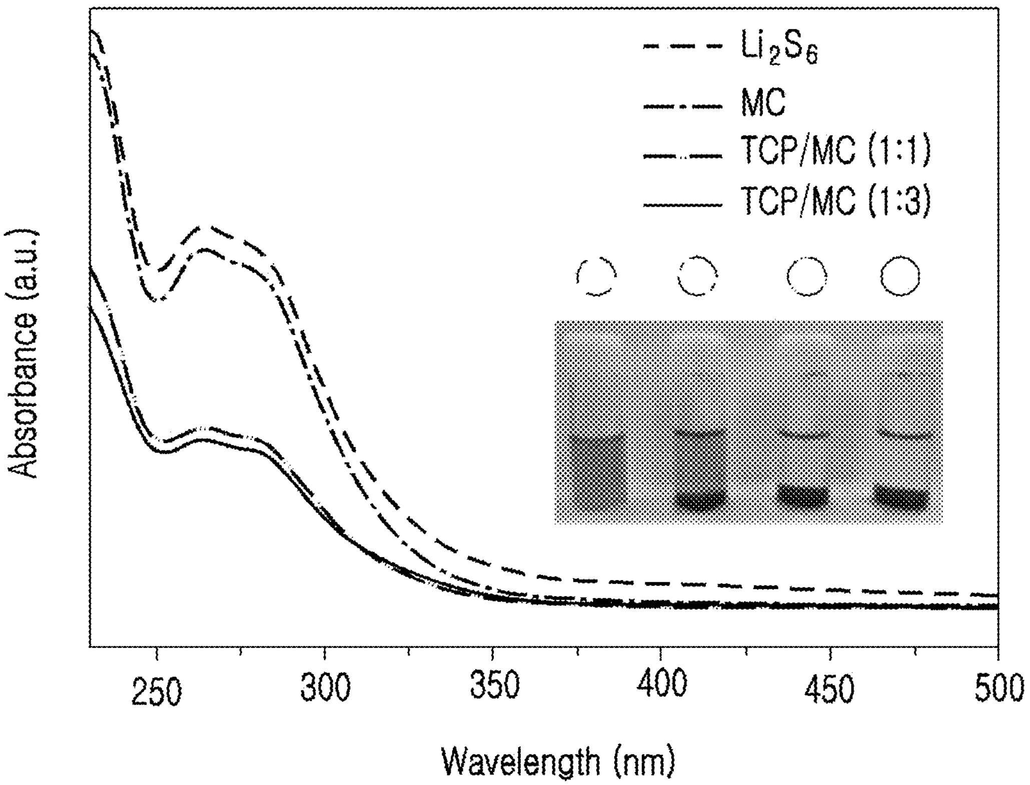
FIG. 5A is a graph comparing and evaluating a catalytic action of a lithium-sulfur battery polysulfide of a cobalt phthalocyanine polymer-carbon nanotube composite according to an embodiment of the present invention with a carbon nanotube as a comparison group.

Referring to FIG. 5A, through the photographic image of polysulfide intermediate adsorption and UV-Vis spectrophotometry, it can be confirmed from the photographic images that the cobalt phthalocyanine polymer-carbon nanotube composite spontaneously adsorbs polysulfide regardless of the synthesis ratio. Also, it can be confirmed that it has superior adsorption ability compared to carbon nanotubes, which are the comparison group.

Figure 5B:
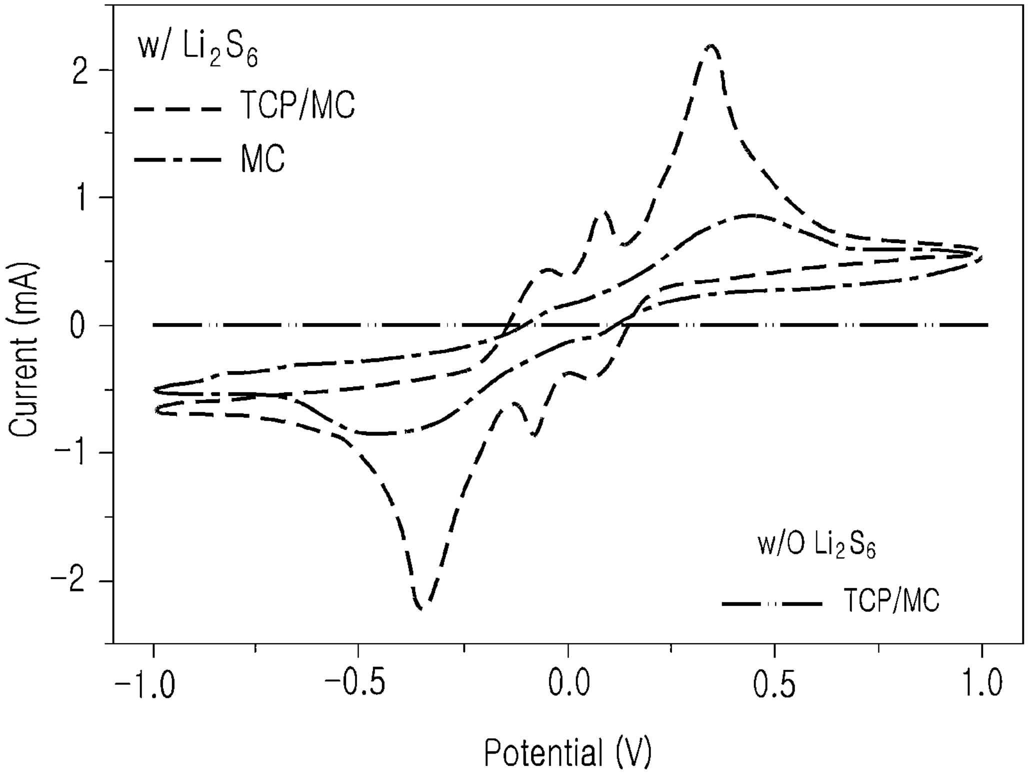
FIG. 5B is a graph comparing and evaluating a catalytic action of a lithium-sulfur battery polysulfide of a cobalt phthalocyanine polymer-carbon nanotube composite according to an embodiment of the present invention with a carbon nanotube as a comparison group.

Referring to FIG. 5B, it can be seen from the oxidation-reduction curve of the symmetric cell polysulfide intermediate that the cobalt phthalocyanine polymer-carbon nanotube complex shows stronger catalytic activity ability than a carbon nanotube, which is a comparative group, and reduces reaction overpotential.

Figure 5C:
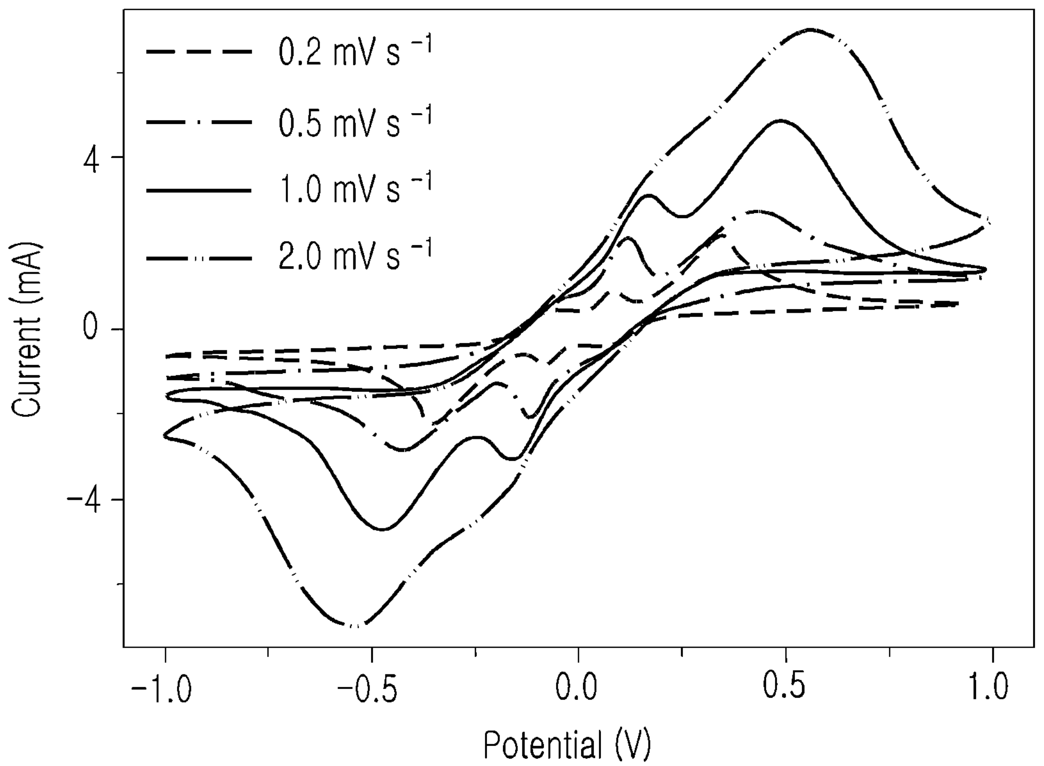
FIG. 5C is a graph comparing and evaluating a catalytic action of a lithium-sulfur battery polysulfide of a cobalt phthalocyanine polymer-carbon nanotube composite according to an embodiment of the present invention with a carbon nanotube as a comparison group.

Referring to FIG. 5C, it can be confirmed from the oxidation-reduction curve of symmetric cell polysulfide intermediates at different scanning rates that the catalytic action of the cobalt phthalocyanine polymer carbon nanotube composite is maintained even at high scanning speeds.

FIG. 6 is a graph comparing an electrochemical performance evaluation of a lithium-sulfur battery of a sulfur cobalt phthalocyanine polymer-carbon nanotube composite with a sulfur carbon nanotube as a comparison group.

Figure 6A:
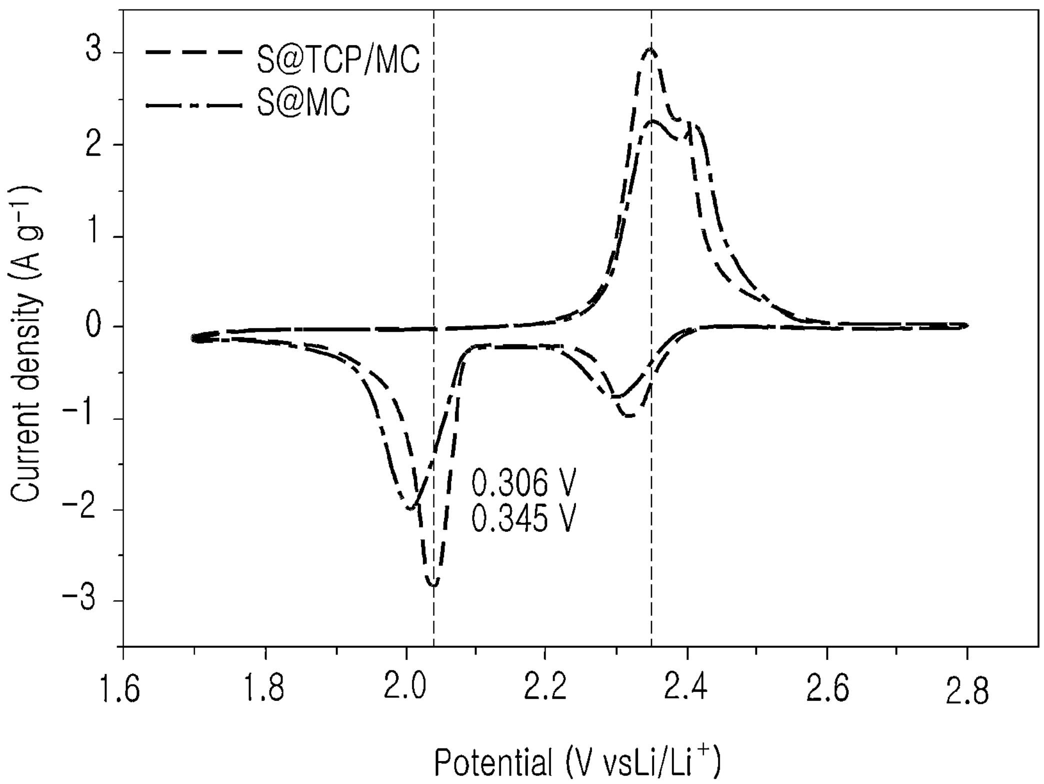
FIG. 6A is a graph showing a cyclic voltammetry curve comparing the electrochemical performance of a lithium-sulfur battery using a sulfur cobalt phthalocyanine polymer-carbon nanotube composite, according to an embodiment of the present invention, with that of a sulfur carbon nanotube used as a comparison group.

FIG. 6A is a graph showing a cyclic voltammetry curve. Referring to FIG. 6A, it can be confirmed from that the sulfur cobalt phthalocyanine polymer-carbon nanotube composite showed a lower overpotential during the oxidation-reduction process compared to a sulfur carbon nanotube, and a large current density. Through this, the fast reaction rate of the sulfur cobalt phthalocyanine polymer-carbon nanotube composite can be confirmed.

Figure 6B:
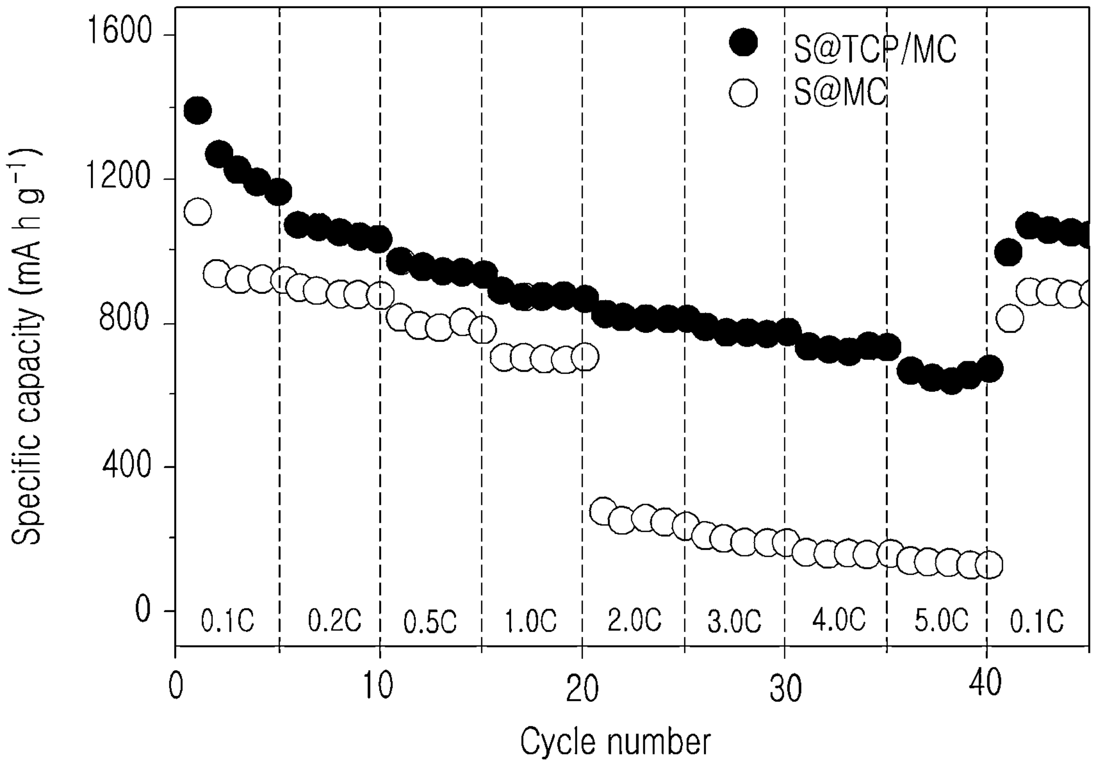
FIG. 6B is a graph showing a rate characteristic evaluation curve, comparing the electrochemical performance of a lithium-sulfur battery using a sulfur cobalt phthalocyanine polymer-carbon nanotube composite, according to an embodiment of the present invention, with that of a sulfur carbon nanotube used as a comparison group.

FIG. 6B is a graph showing a rate characteristic evaluation curve. Referring to FIG. 6B, the sulfur cobalt phthalocyanine polymer-carbon nanotube composite shows a higher reversible capacity than that of a sulfur carbon nanotube, and excellent reversible capacity at a high rate can be confirmed.

Figure 6C:
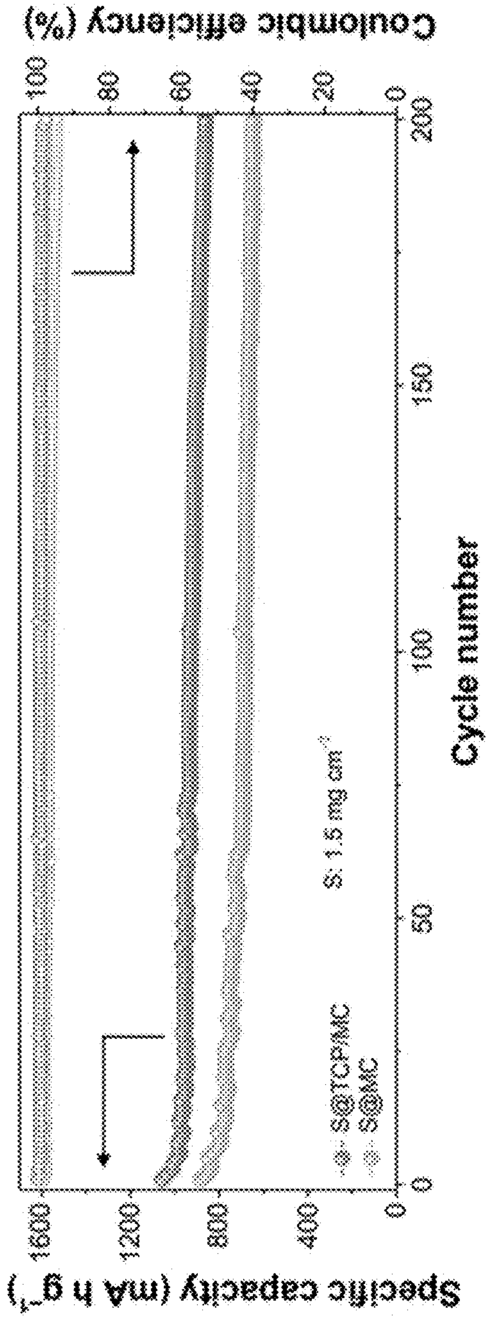
FIG. 6C is a graph showing periodic stability and capacity retention collinearity, comparing the electrochemical performance of a lithium-sulfur battery using a sulfur cobalt phthalocyanine polymer-carbon nanotube composite, according to an embodiment of the present invention, with that of a sulfur carbon nanotube used as a comparison group.

FIG. 6C is a graph showing periodic stability and capacity retention collinearity. Referring to FIG. 6C, it can be seen that the sulfur cobalt phthalocyanine polymer-carbon nanotube composite shows a more stable capacity retention rate than that of a sulfur carbon nanotube.

Therefore, through the performance evaluation of FIGS. 2 to 6, it can be confirmed that the sulfur cobalt phthalocyanine polymer-carbon nanotube composite of the present invention can be applied as an excellent positive electrode for a lithium-sulfur battery.

Experimental Example 2

FIG. 9 is a photograph analyzed using a scanning electron microscope (SEM) before and after depositing lithium metal on a general carbon fiber current collector and carbon fiber current collector coated with the transition metal phthalocyanine polymer of the present invention.

Figure 9A:
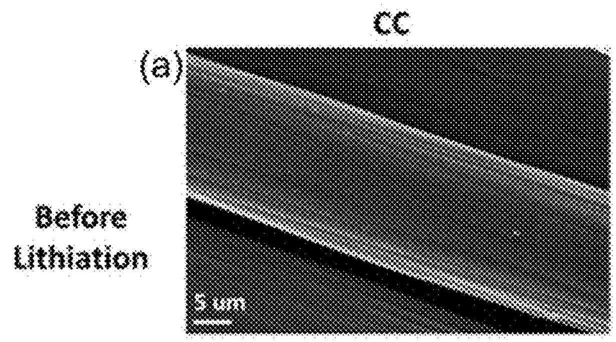
FIG. 9A is a photograph analyzing a general carbon fiber current collector that is not coated with the transition metal phthalocyanine polymer.
Figure 9B:
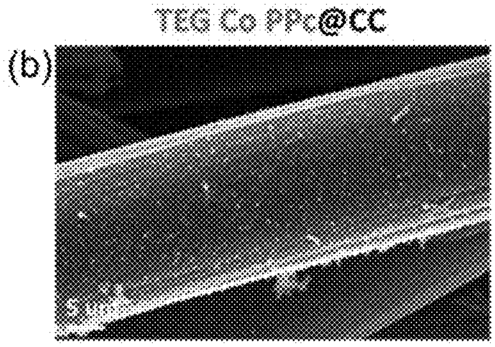
FIG. 9B is a photograph analyzing the carbon fiber current collector coated with a transition metal phthalocyanine polymer.

First, FIGS. 9A and 9B were prepared to compare the appearances of a general carbon fiber current collector and carbon fiber current collector coated with a transition metal phthalocyanine polymer before deposing lithium metal.

FIG. 9A is a photograph analyzing a general carbon fiber current collector that is not coated with the transition metal phthalocyanine polymer. Referring to FIG. 9A, it can be seen that the carbon fiber is not coated and the current collector is clean.

On the other hand, FIG. 9B is a photograph analyzing the carbon fiber current collector coated with a transition metal phthalocyanine polymer. Referring to FIG. 9B, it can be seen that there is a material coated on the carbon fiber current collector.

Figure 9C:
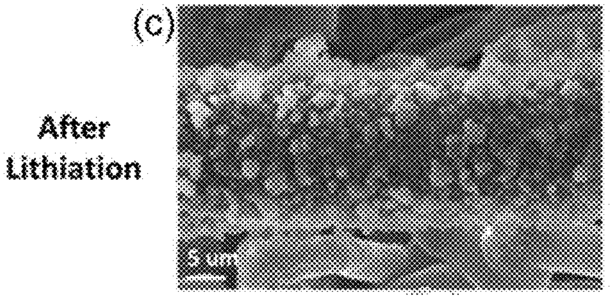
FIG. 9C shows a photograph after depositing lithium metal on a carbon fiber current collector.
Figure 9D:
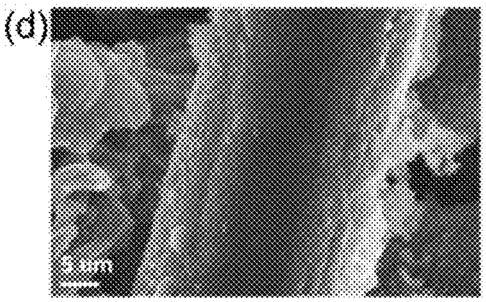
FIG. 9D shows a photograph after depositing lithium metal on a carbon fiber current collector.

FIGS. 9C and 9D show photographs after depositing lithium metal on a carbon fiber current collector. Referring to FIG. 9C, the transition metal phthalocyanine polymer is not coated, and dendritic growth can be confirmed on the carbon fiber current collector.

On the other hand, referring to FIG. 9D, since the transition metal phthalocyanine polymer is coated on the carbon fiber current collector, dendritic growth cannot be found.

Figure 9E:
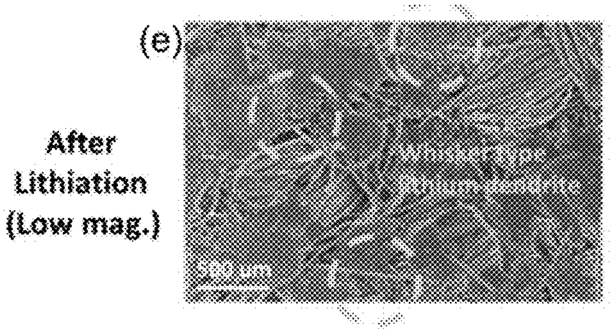
FIG. 9E is a photograph analyzed at low magnification of FIG. 9C.
Figure 9F:
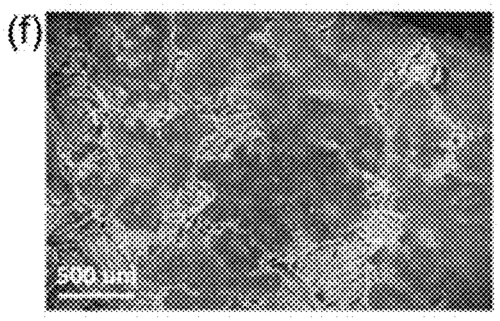
FIG. 9F is a photograph analyzed at low magnification of FIG. 9D.

FIGS. 9E and 9F are photographs analyzed at low magnification of FIGS. 9C and 9D, respectively. Even in the photographs analyzed at low magnification, whisker crystal type dendritic growth can be confirmed in FIG. 9E, whereas it can be seen once again that there is no dendritic growth in FIG. 9F.

Experimental Example 3

Figure 10A:
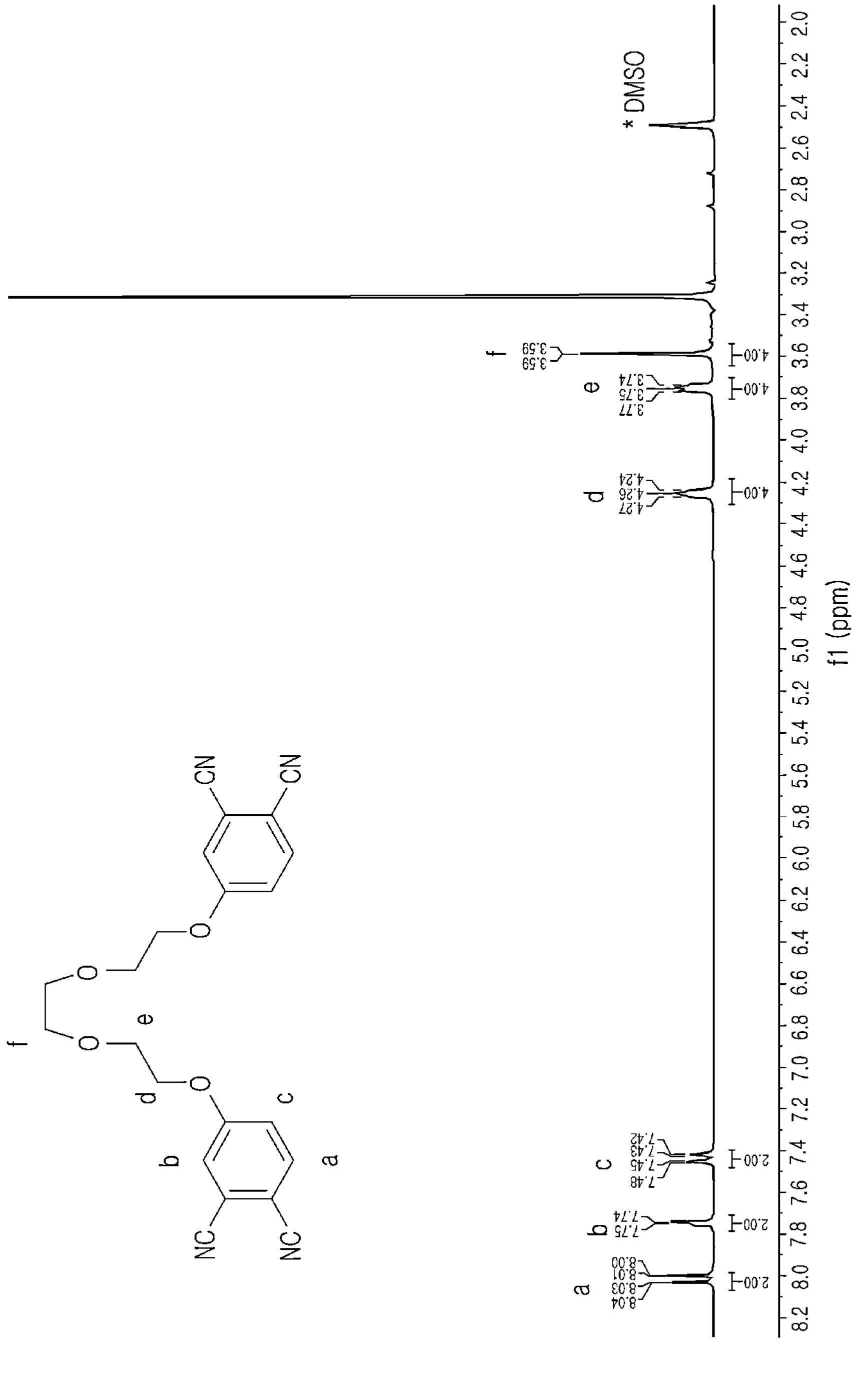
FIG. 10A shows 1H NMR and 13C NMR analysis according to an embodiment of the present invention.
Figure 10B:
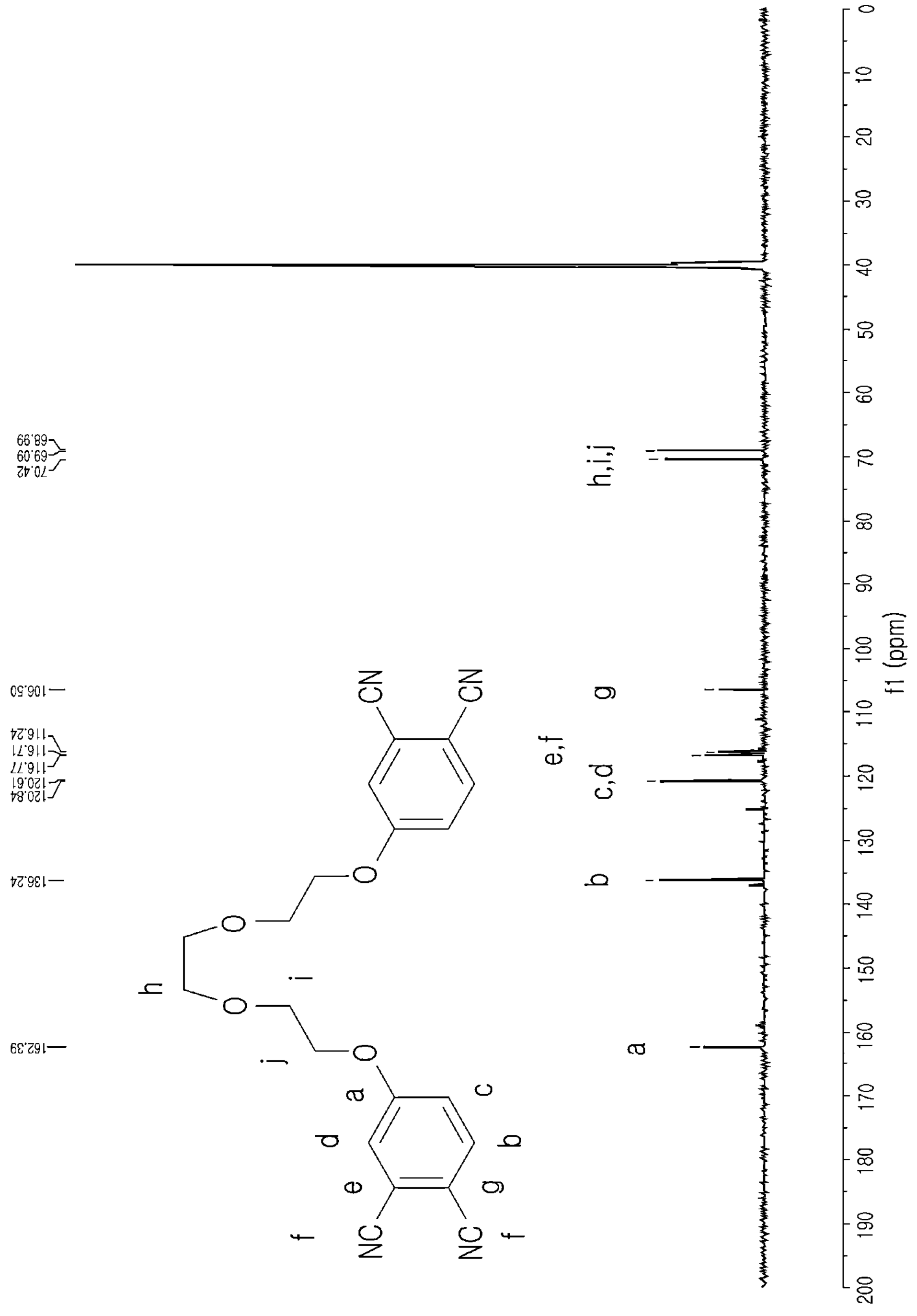
FIG. 10B shows 1H NMR and 13C NMR analysis according to an embodiment of the present invention.

FIGS. 10A and 10B show 1H NMR and 13C NMR analysis, respectively, to confirm the components of the synthesized triethylene glycol-phthalonitrile dimer.

First, 4-nitrophthalonitrile and triethylene glycol were dissolved in dimethylformamide, then potassium carbonate was added and reacted at 50° C. for 24 to 72 hours to synthesize a dimer.

Next, organic substances were eluted from the reaction mixture including the synthesized dimer using distilled water, and the eluate was filtered using vacuum filtration.

Next, the filtered eluate was stirred in ethanol at 80° C. for 12 hours.

Next, the reaction mixture was cooled to room temperature, and the result was filtered through filtration.

Next, after drying in a vacuum oven at 80° C. for 16 hours, the purity of the composite was confirmed using 1H NMR and 13C NMR.

As a result, it was confirmed through the position of the NMR peak that the dimer to be used as a precursor was well synthesized.

Experimental Example 4

Figure 11:
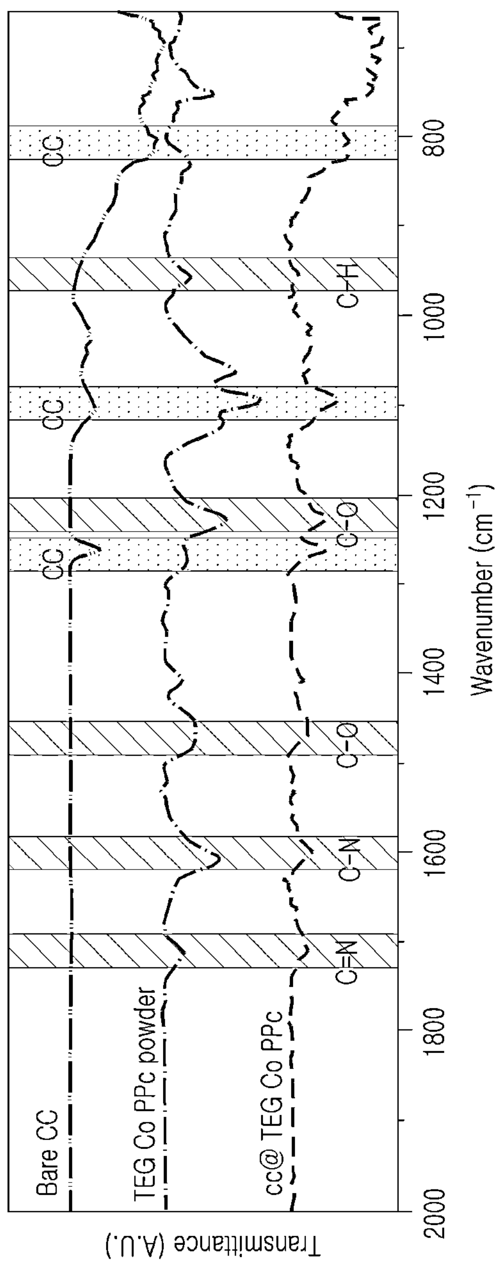
FIG. 11 shows a result of infrared spectroscopy analysis according to an embodiment of the present invention.

FIG. 11 shows a result of infrared spectroscopy analysis to confirm whether the transition metal-phthalocyanine polymer was well coated on the carbon fiber current collector. First, in order to synthesize the transition metal-phthalocyanine polymer and coat it on the carbon fiber current collector, a transition metal acetate salt and precursor dimer are dissolved in dimethylformamide at room temperature, then 1-pentanol and 1, 8-diazabicyclo [5,4, 0] Undec-7-ene (DBU) were added and placed in a solvothermal synthesizer along with the carbon fiber current collector to perform solvothermal synthesis at 180° C. for 16 hours.

Next, the overpolymerized polymer and unreacted precursors on the current collector were washed with ethanol and acetone and dried at room temperature.

Next, the dried current collector was further heat treated for 2 hours under inert gas conditions at a temperature of 300° C. to 350° C. to remove residual solvent and organic molecules.

Next, infrared spectroscopy was performed to determine whether the transition metal-phthalocyanine polymer was well coated on the carbon fiber current collector.

In FIG. 11, a general carbon fiber current collector, the transition metal-phthalocyanine polymer powder, and the carbon fiber current collector coated with the transition metal-phthalocyanine polymer are shown.

Referring to FIG. 11, the carbon fiber current collector was confirmed to have a double bond of carbon and nitrogen (C═N), a single bond of carbon and nitrogen (C—N), and a single bond of carbon and oxygen (C—O), which indicates that the transition metal-phthalocyanine polymer was well coated on the fiber current collector.

Experimental Example 5

Figure 12:
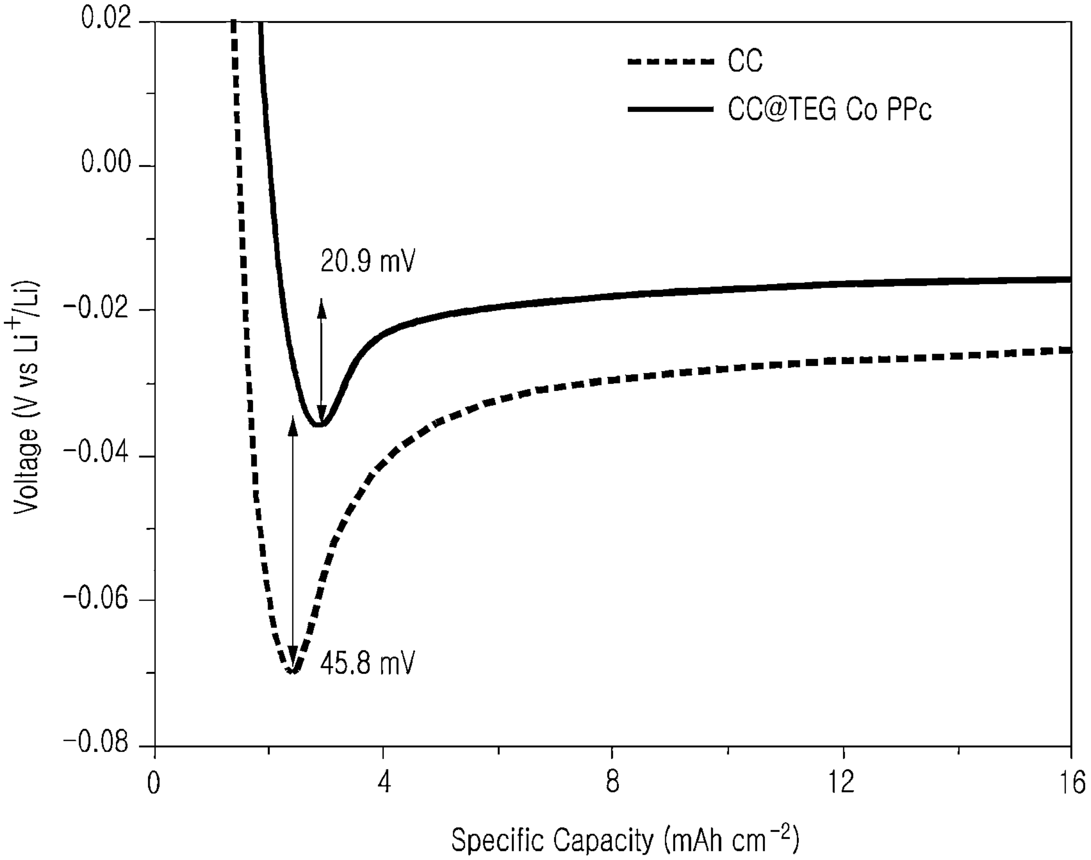
FIG. 12 shows an overpotential graph of a carbon fiber current collector according to an embodiment of the present invention.

FIG. 12 shows an overpotential graph of the carbon current collector on which lithium metal was deposited and the carbon current collector coated with the transition metal-phthalocyanine polymer on which lithium metal was deposited at a constant current density.

In FIG. 12, the dashed line indicates lithium metal deposited on the carbon current collector coated with the transition metal-phthalocyanine polymer, and the dot line indicates lithium metal deposited on a general carbon current collector.

Referring to FIG. 12, it can be seen that a lower overpotentail is observed when lithium metal is deposited on the carbon fiber current collector coated with the transition metal-phthalocyanine.

This means that in the process of depositing lithium ions into lithium metal, the lithium ions are more easily deposited on the carbon fiber current collector coated with the transition metal-phthalocyanine than on a general carbon fiber current collector.

Experimental Example 6

Figure 13:
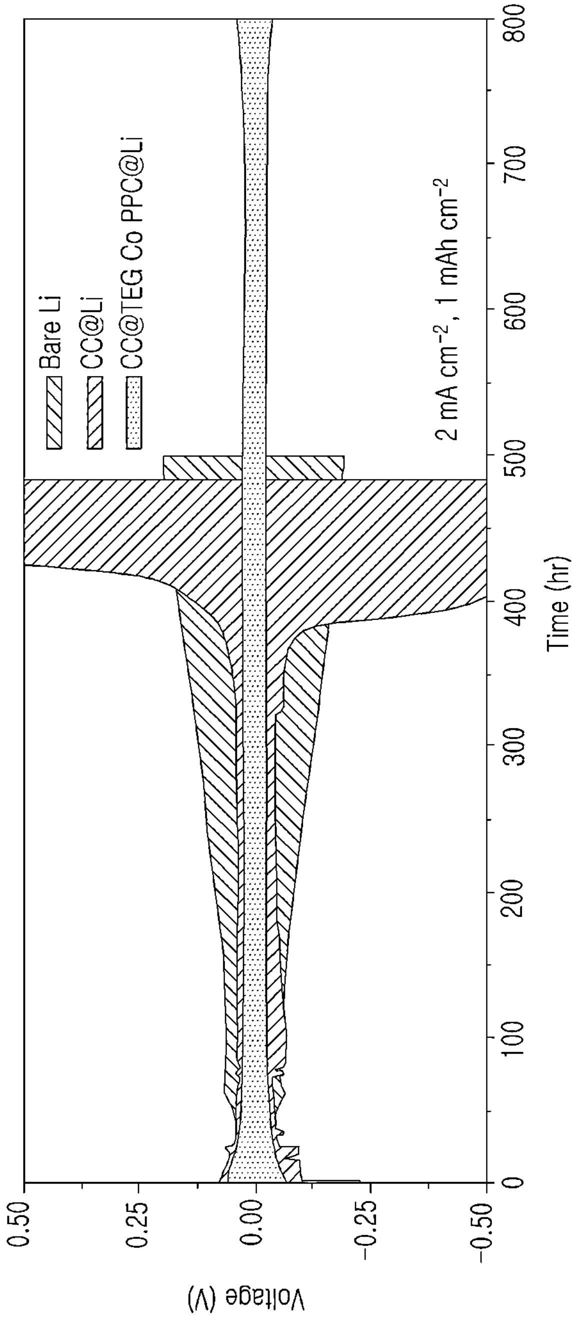
FIG. 13 shows a cycle stability analysis of a symmetrical cell including a carbon fiber current collector according to an embodiment of the present invention.

FIG. 13 shows a cycle stability of the carbon fiber current collector on which lithium metal is deposited.

In FIG. 13, the area of CC@TEG Co PPc@Li indicates a lithium battery including the carbon fiber current collector coated with the transition metal-phthalocyanine, and the area of Cc@Li indicates a lithium battery including a general carbon fiber current collector.

Referring to FIG. 13, when deposition/stripping was performed at 1 $mAh/cm^2$ capacity conditions at a time under 2 $mA/cm^2$ current conditions, the lithium battery including the carbon fiber current collector coated with the transition metal-phthalocyanine showed the cycle stability of 800 hours at 20 mV overpotential. On the other hand, the lithium symmetry battery including a general carbon fiber current collector showed the cycle stability of about 400 hours at an overpotential of 30 mV.

This means that the lithium battery including the carbon fiber current collector coated with the transition metal-phthalocyanine shows improved cycle stability and improved overpotential performance.

Experimental Example 7

Figure 14:
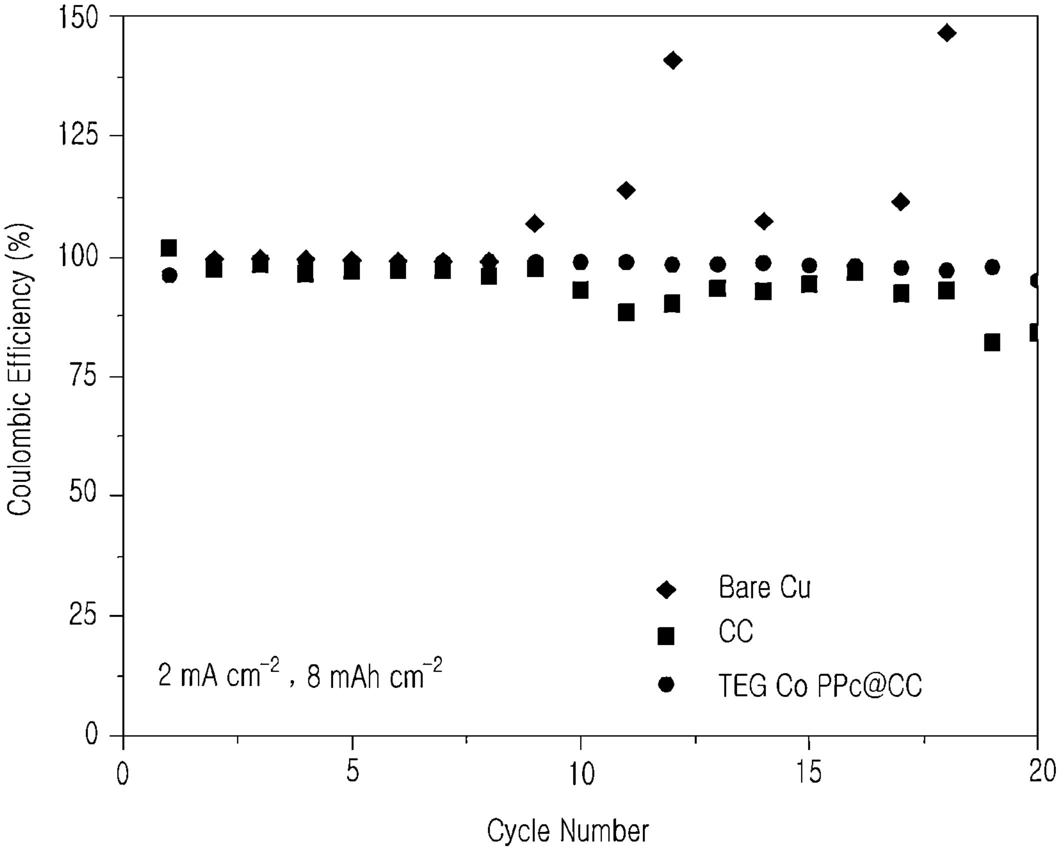
FIG. 14 shows a graph of coulombic efficiency measurement according to an embodiment of the present invention.

FIG. 14 shows a graph of coulombic efficiency measurement, which was performed to determine how much lithium ions are consumed in an irreversible reaction due to side reactions during the deposition of lithium metal on a carbon fiber current collector.

Referring to FIG. 14, it can be seen that when the transition metal-phthalocyanine polymer uses lithium metal in a carbon fiber current collector under conditions of 2 $mA/cm^2$ and 8 $mAh/cm^2$, it can be seen that the coulombic efficiency is 98% over 10 cycles.

On the other hand, when lithium metal was used in a general carbon fiber current collector, the efficiency was similarly shown as 98%, but it was confirmed that the battery life quickly expired after 10 cycles.

In other words, when the transition metal-phthalocyanine polymer uses lithium metal in the carbon fiber current collector, a stable coulombic efficiency of 98.9% for 20 cycles was shown. Through this, it can be seen that that using the carbon fiber current collector coated with the transition metal-phthalocyanine polymer has the advantage of improving the lifespan of the battery.

Experimental Example 8

FIG. 15 is a graph showing a comparison of a charging and discharging effect with a lithium foil after designing an actual battery by matching the capacity ratio of the positive and negative electrode materials, for use as an actual battery, In order to confirm whether the kinetic properties of an actual battery were improved, the charge/discharge voltage modification of the battery was compared with and without the application of the carbon fiber current collector coated with the transition metal-phthalocyanine.

Figure 15A:
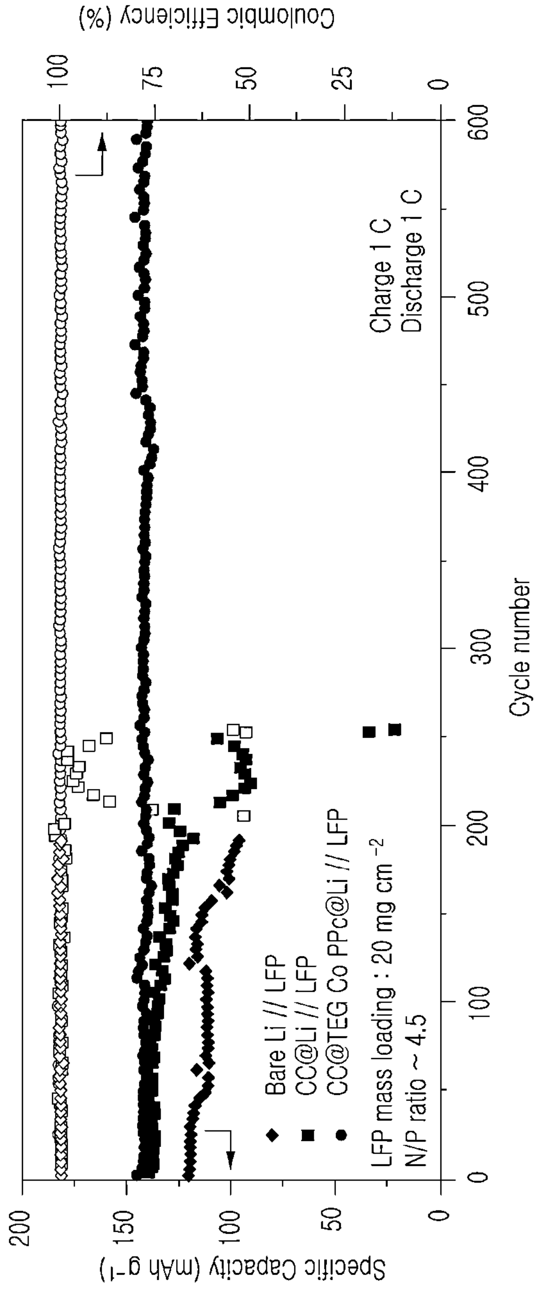
FIG. 15A shows an analysis of LFP/Li full cell data and cycle stability according to an embodiment of the present invention, where the cycle stability was measured under 1 C conditions.
Figure 15B:
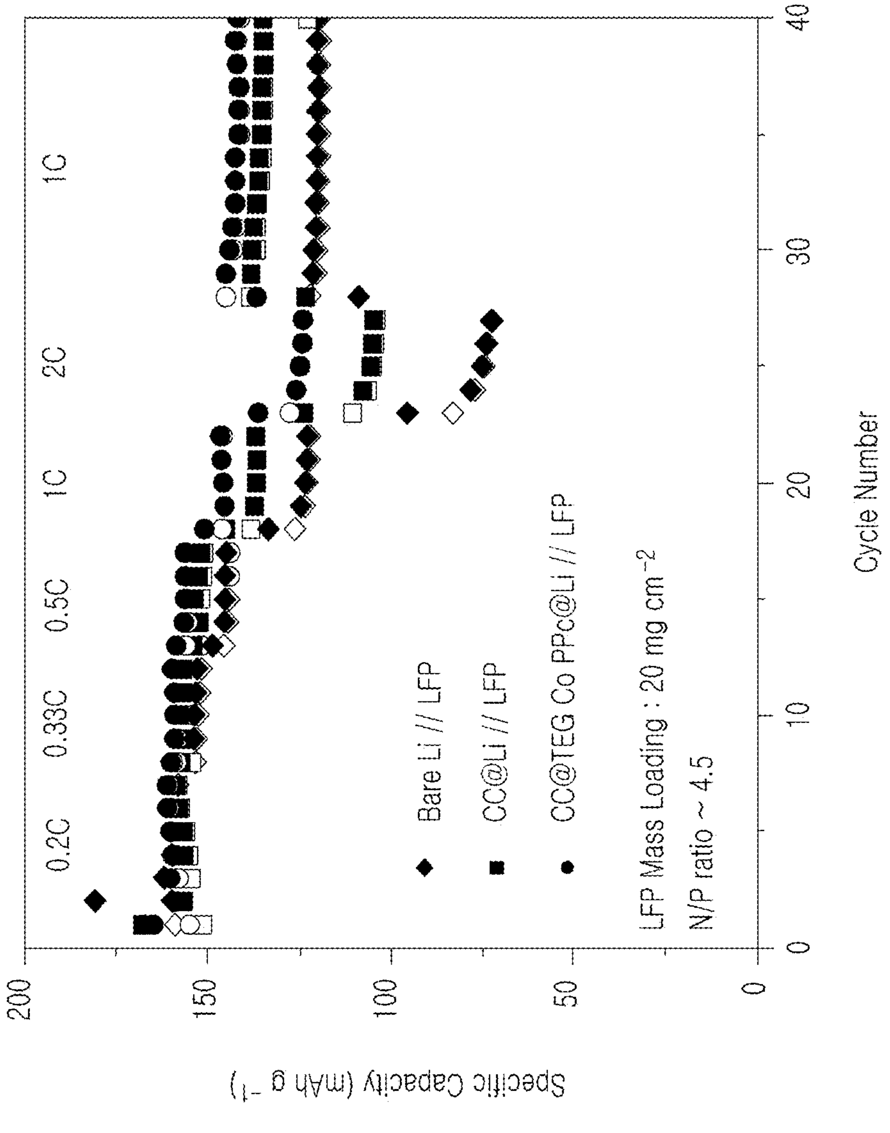
FIG. 15B shows an analysis of LFP/Li full cell data and cycle stability according to an embodiment of the present invention, where the rate data was measured under conditions of 0.2 C to 2 C.

FIG. 15A shows the cycle stability was measured under 1 C conditions, and FIG. 15B shows the rate data was measured under conditions of 0.2 C to 2 C.

As a result, the overpotential at the charge/discharge peaks was measured to be low in the carbon fiber current collector coated with the transition metal-phthalocyanine polymer, and in subsequent rate data, a lower capacity reduction rate was confirmed in the carbon fiber current collector coated with the transition metal-phthalocyanine polymer.

Additionally, in the cycle stability of an actual battery, stability up to 100 cycles was confirmed.

In conclusion, the carbon fiber current collector coated with the transition metal-phthalocyanine polymer solves the low lithium ion affinity of the carbon fiber current collector by coating the carbon fiber on the surface of the current collector, and has the advantage of solving dendrite growth problems caused by uneven lithium ion distribution.

In addition, the properties of the material can be easily controlled by changing the linkage required for polymerization during the synthesis process, which has the advantage of controlling the deposition of optimized lithium metal and applying it as an energy storage material.

The negative electrode for a lithium battery in which lithium metal was deposited on the carbon fiber current collector coated with the transition metal-phthalocyanine polymer did not produce dendritic crystal growth of lithium metal, and has the advantage of maintaining cycle stability for a long time compared to a negative electrode for a lithium battery in which lithium metal was disposed on a conventional carbon fiber current collector.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the invention is to be defined by the scope of claims provided below, and all variations or modifications that can be derived from the meaning and scope of the claims as well as their equivalents are to be interpreted as being encompassed within the scope of the present invention.

According to an embodiment of the present invention, the performance of a positive electrode host material for a lithium-sulfur battery can be optimized to solve the problems of low conductivity of sulfur as an energy storage material and volume expansion during charging and discharging.

According to an embodiment of the present invention, it can be used as a host material for a lithium-sulfur battery and as a material for a next-generation energy storage device with high energy density through continuous capacity reduction and improvement of low charge and discharge efficiency.

According to an embodiment of the present invention, the transition metal phthalocyanine polymer as a negative electrode material is coated on the surface of the carbon fiber current collector through polymerization, thereby solving the low lithium ion affinity of the carbon fiber current collector.

According to embodiments of the present invention, the problem of dendritic growth caused by uneven lithium ion distribution can be solved.

According to an embodiment of the present invention, the properties of the material can be easily controlled by changing the linkage required for polymerization during the synthesis process, thereby controlling the deposition of optimized lithium metal and applying it as an energy storage material.

The effects of the present disclosure are not limited to the above-mentioned effects, and it should be understood that the effects of the present disclosure include all effects that could be inferred from the configuration of the invention described in the detailed description of the invention or the appended claims.

What is claimed is:

1. A positive electrode material comprising a polymer including a repeating unit represented by the following Formula 1 and a carbon compound:

[Formula1]

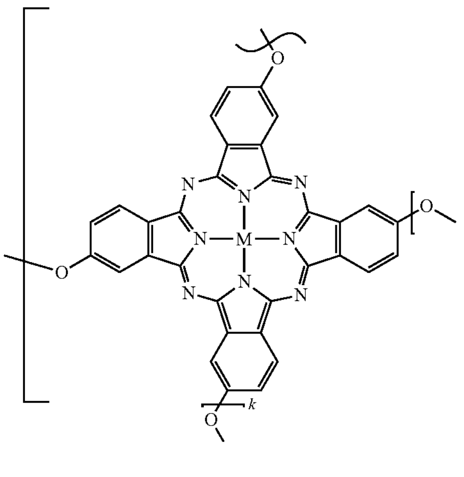

-continued

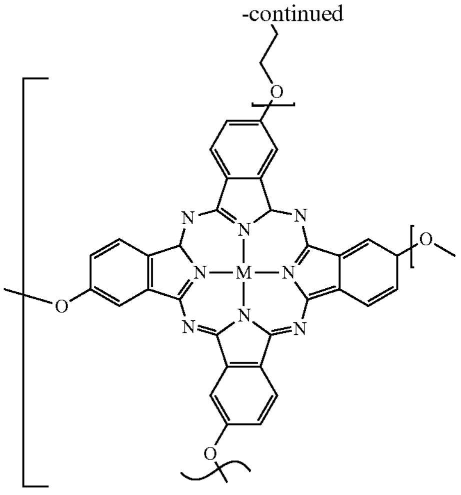

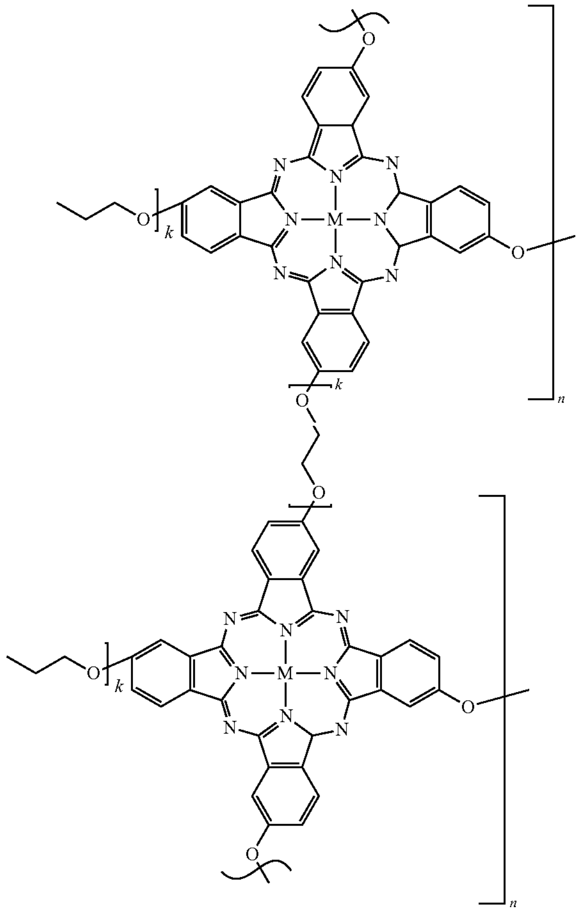

Wherein the n is an integer from 2 to 1000, and the k is an integer from 1 to 5, and the M is a transition metal.

2. The positive electrode material of claim 1, wherein the polymer is prepared from a dimer synthesized by reacting a plurality of compounds represented by the following Formula 2 with a linker.

[Formula 2]

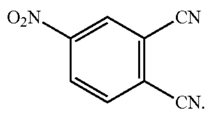

3. The positive electrode material of claim 2, wherein the linker is a compound represented by the following Formula 3:

[Formula 3]

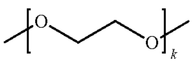

wherein the k is an integer from 1 to 5.

4. The positive electrode material of claim 2, wherein the reaction is a nucleophilic substitution reaction.

5. The positive electrode material of claim 1, wherein the carbon compound is selected from a fullerene, a carbon nanotube, a graphene, a carbon felt, a carbon cloth, and a carbon paper.

6. The positive electrode material of claim 1, wherein the transition metal is one or a plurality of metals selected from cobalt, zinc, nickel, and copper.

7. A negative electrode material comprising a repeating unit represented by the following Formula 4:

[Formula 4]

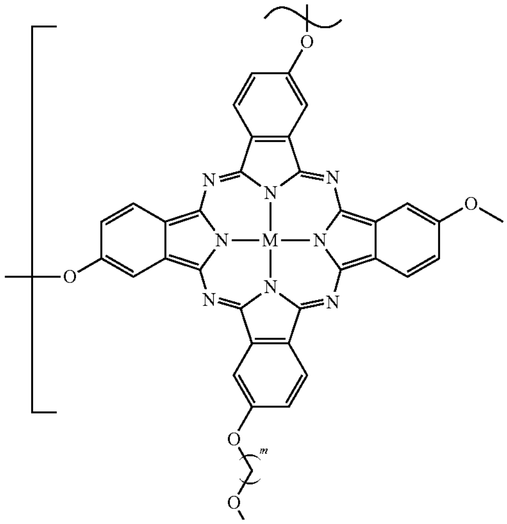

-continued

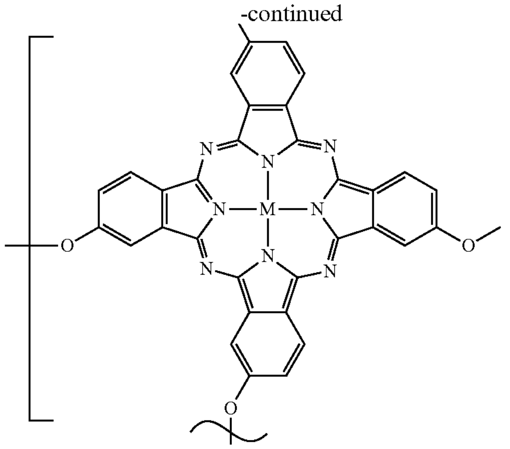

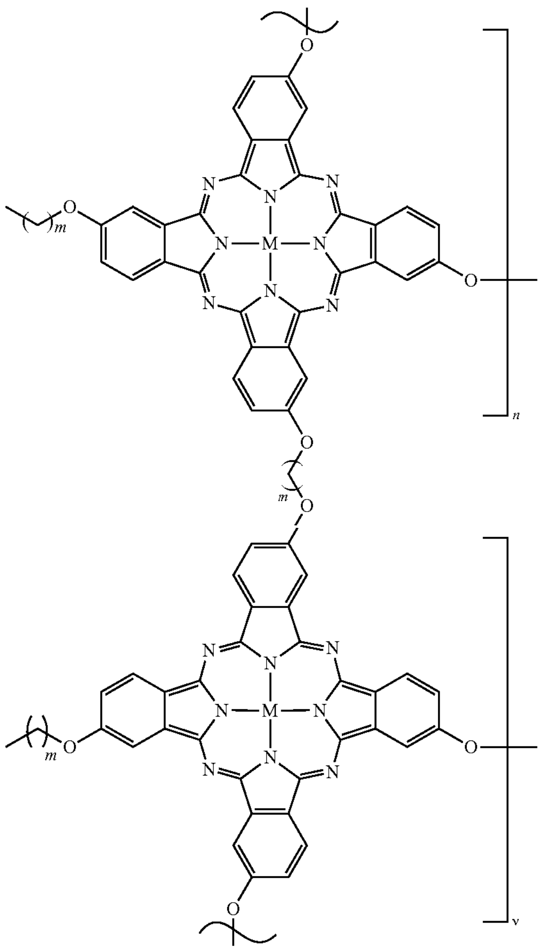

in the Formula 4, the n is an integer from 2 to 1000, the m is an integer from 2 to 10, and the M is a transition metal.

8. The negative electrode material of claim 7, wherein the negative electrode material is prepared from a dimer represented by the following Formula 5:

[Formula 5]

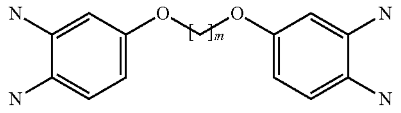

in the Formula 5, the m is an integer from 2 to 10.

9. The negative electrode material of claim 8, wherein the dimer is produced by modifying a nitrile-based compound with a linker and then reacting it.

10. The negative electrode material of claim 7, wherein the transition metal is one or a plurality of metals selected from cobalt, zinc, nickel, and copper.

11. A current collector coating method comprising the steps of:

synthesizing a dimer represented by the following Formula 5;

producing a negative electrode material represented by the following Formula 4 by polymerizing the dimer with an organic compound including a transition metal; and coating the negative electrode material on a current collector,

[Formula 4]

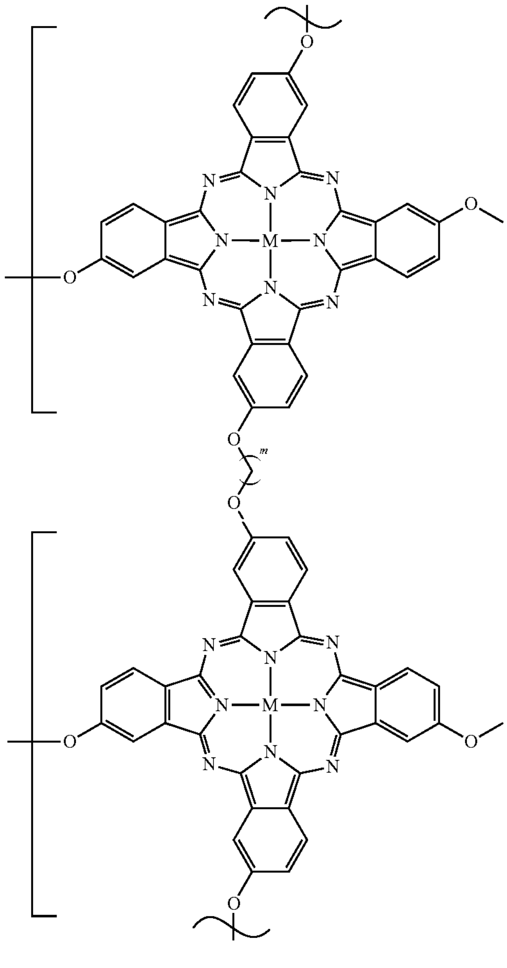

-continued

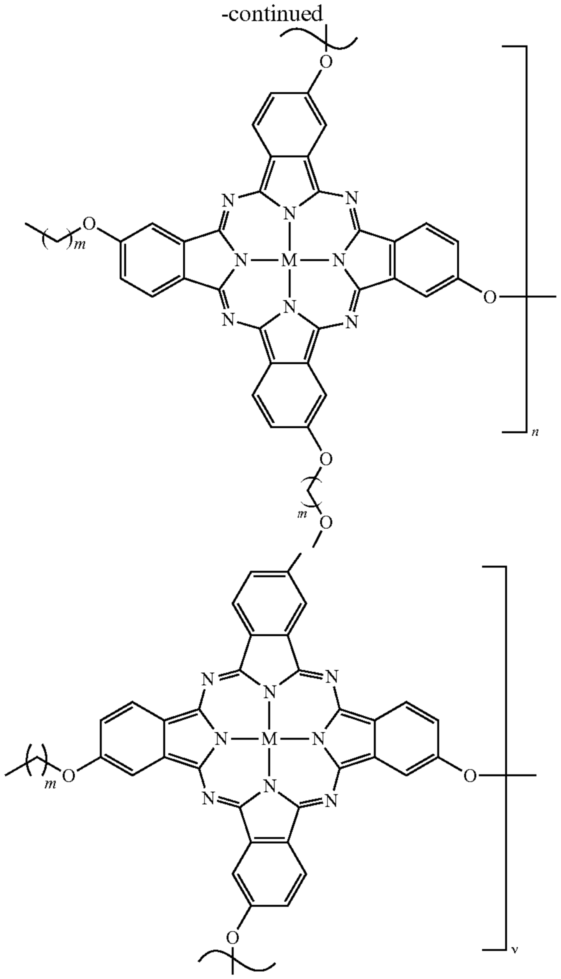

in the Formula 4, the n is an integer from 2 to 1000, the m is an integer from 2 to 10, and the M is a transition metal,

[Formula 5]

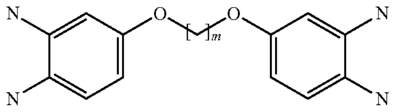

in Formula 5, the m is an integer from 2 to 10.

12. The current collector coating method of claim 11, wherein the step of synthesizing the dimer represented by the Formula 5 is configured to include the steps of:

modifying a plurality of phthalonitriles with a linker; and connecting the plurality of modified phthalonitriles with the linker.

13. The current collector coating method of claim 11, wherein the transition metal is one or a plurality of metals selected from cobalt, zinc, nickel, and copper.

14. The current collector coating method of claim 11, wherein in the step of coating the transition metal-phthalocyanine polymer on the current collector, the coating is coated by performing a solvothermal synthesis method.

15. A current collector for an electrode, comprising:

a current collector; and the negative electrode material of claim 8 coated on the current collector.

16. The current collector for an electrode of claim 15, wherein the current collector includes a composite structure including a carbon fiber.

17. A negative electrode for a lithium battery, comprising:

the current collector of claim 15; and a lithium metal located on the current collector.

18. A lithium-sulfur battery comprising:

the positive electrode for a lithium-sulfur battery of claim 6; and the negative electrode of claim 17.

* * * * *